(12) United States Patent
Sones et al.

(10) Patent No.: US 8,508,591 B2
(45) Date of Patent: Aug. 13, 2013

(54) SYSTEM AND METHOD FOR ESTIMATING THE HEIGHT OF AN OBJECT USING TOMOSYNTHESIS-LIKE TECHNIQUES

(75) Inventors: Richard A. Sones, Cleveland Heights, OH (US); Carl E. Sebeny, Cuyahoga Falls, OH (US)

(73) Assignee: Applied Vision Corporation, Cuyahoga Falls, OH (US)

( * ) Notice: Subject to any disclaimer, the term of this patent is extended or adjusted under 35 U.S.C. 154(b) by 750 days.

(21) Appl. No.: 12/700,764

(22) Filed: Feb. 5, 2010

(65) Prior Publication Data
US 2011/0193953 A1    Aug. 11, 2011

(51) Int. Cl.
*H04N 7/18* (2006.01)
(52) U.S. Cl.
USPC .......................................................... 348/135
(58) Field of Classification Search
USPC .......................................................... 348/135
See application file for complete search history.

(56) References Cited

U.S. PATENT DOCUMENTS

| | | |
|---|---|---|
| 5,042,015 A | 8/1991 | Stringer |
| 5,105,392 A | 4/1992 | Stringer et al. |
| 5,220,536 A | 6/1993 | Stringer |
| 5,422,861 A | 6/1995 | Stringer |
| 5,530,420 A | 6/1996 | Tsuchiya et al. |
| 5,606,534 A | 2/1997 | Stringer |
| 5,636,028 A | 6/1997 | Stringer et al. |
| 5,719,678 A | 2/1998 | Reynolds et al. |
| 5,744,793 A | 4/1998 | Skell et al. |
| 5,808,912 A | 9/1998 | Dlugos |
| 5,850,370 A | 12/1998 | Stringer |
| 5,914,463 A | 6/1999 | Dlugos |
| 6,049,386 A | 4/2000 | Stringer |
| 6,298,009 B1 | 10/2001 | Stringer |

(Continued)

FOREIGN PATENT DOCUMENTS

| | | |
|---|---|---|
| CA | 2346278 A1 | 11/2002 |
| DE | 19748062 A1 | 5/1999 |

(Continued)

OTHER PUBLICATIONS

S. Gondrom, S. Schropfer, FhG ITFP, Saarbrucken, D., Digital computed laminography and tomosynthesis—functional principles and industrial applications, NDT.net, info@ndt.net, Jul. 1999, vol. 4 No. 7, 5 pages.

(Continued)

*Primary Examiner* — Richard Torrente
(74) *Attorney, Agent, or Firm* — Hahn Loeser & Parks, LLP

(57) ABSTRACT

Systems and methods to estimate the height profile of an object using tomosynthesis-like techniques. A plurality of raw images of an object to be characterized are acquired, where the plurality of raw images are representative of a plurality of spatial shifts of an imaging device relative to the object to be characterized. The raw images are processed to generate composite images, where each composite image corresponds to a unique image shift between spatially adjacent raw images. A volatility parameter value is calculated within a neighborhood of a same image pixel location for each composite image. The composite image having the largest volatility parameter value for the image pixel location is determined. A unique image shift, corresponding to the composite image having the largest volatility parameter value, is transformed into a height value representative of a height dimension of the image pixel location.

17 Claims, 17 Drawing Sheets

(56) References Cited

U.S. PATENT DOCUMENTS

| | | | |
|---|---|---|---|
| RE37,610 E | 3/2002 | Tsuchiya et al. | |
| 6,445,390 B1 | 9/2002 | Aftosmis et al. | |
| 6,480,301 B1 | 11/2002 | Cholewo | |
| 6,554,189 B1 | 4/2003 | Ghosh et al. | |
| 6,611,787 B2 | 8/2003 | Stringer | |
| 6,850,464 B2 | 2/2005 | Carlsruh et al. | |
| 2002/0039187 A1* | 4/2002 | Keranen | 356/604 |
| 2002/0162886 A1 | 11/2002 | Arsenault et al. | |
| 2002/0181762 A1* | 12/2002 | Silber | 382/154 |
| 2004/0022418 A1 | 2/2004 | Oota | |
| 2004/0240754 A1 | 12/2004 | Smith et al. | |
| 2004/0246333 A1 | 12/2004 | Steuart, III | |
| 2006/0067572 A1 | 3/2006 | White et al. | |
| 2010/0182406 A1* | 7/2010 | Benitez | 348/46 |

FOREIGN PATENT DOCUMENTS

| | | |
|---|---|---|
| DE | 102004053416 A1 | 5/2006 |
| DE | 102007025373 B3 | 7/2008 |
| EP | 0364614 A1 | 4/1990 |
| EP | 0477078 A1 | 3/1992 |
| EP | 1100048 A1 | 5/2001 |
| ES | 2184541 A1 | 4/2003 |
| FR | 2783068 A1 | 3/2000 |
| GB | 1913-01535 A | 0/1913 |
| GB | 445716 A | 4/1936 |
| GB | 468481 A | 7/1937 |
| GB | 756994 A | 9/1956 |
| GB | 786534 A | 11/1957 |
| JP | 58130361 A | 8/1983 |
| JP | 63010280 A | 1/1988 |
| JP | 8210851 A | 8/1996 |
| JP | 2002044686 A | 2/2002 |
| JP | 2002148732 A | 5/2002 |
| WO | 9617258 A2 | 6/1996 |
| WO | 9934336 A1 | 7/1999 |
| WO | 03-002935 A1 | 1/2003 |
| WO | 2004-072578 A1 | 8/2004 |
| WO | 2008057504 A2 | 5/2008 |

OTHER PUBLICATIONS

CS5400 BarCoded YardStick Systems—Simple, Low Cost Dimensioning, http://us.mt.com/us/en?homeproducts/Transport_and_Logistics_Solutions/parcel_dimensioners_cargoscan/Static_dimensioning_weighing/SC5400_Dimensioner.html, Apr. 21, 2010, www.mt.com/cargoscan, Mettler-Toledo Cargoscan AS, Inc., Norway.

CS5400 BarCoded YardStick—Easy measuring for getting started, www.mt.com/cargoscan, Dec. 2006, Mettler-Toledo Cargoscan AS, Inc., Norway.

CNS810—Capture package data quickly and accurately, www.mt.com/cargoscan, Jun. 2006, Mettler-Toledo, Inc., Columbus, OH.

System Solutions, VMS420/520/ VMS520, https://mysick.com/partnerPortal/ProductCatalog/DataSheet.aspx?ProductID=41349, Nov. 2006, pp. 1-10, Germany.

Dimensioning, http://www.accusort.com/applications/dimensioning.html, Apr. 21, 2010.

DM3500 Package Dimensioning System, http://www.accusort.com/applications/dimensioners/dm3500.html, Apr. 21, 2010.

AccuVision AV6010 Camera Bar Code Scanning System with Optional Dimensioning, http://www.accusort.com/products/barcodescanners/longrange/av6010.html, Apr. 21, 2010.

ExpressCube Countertop Series, www.expresscube.com, 2006, Ontario, CA.

* cited by examiner

Fig. 11    19 Raw Images of a Box

Fig. 12  Box Image: n=0

Composite Images

As σ goes from -5 to -20 the plane of focus moves up from below the box, through the table top, through the box top, then above the box.

Fig. 14  19 Raw Images of a Ruler

Fig. 16 Composite Images
As σ goes from -5 to -20 the plane of focus moves up from below the ruler, through the table top, up the ruler, then above the ruler.

Composite image with $\sigma = -10$.

Note that inch 9 is in focus while inches 8 and 10 are out of focus. This illustrates the small depth of field achievable with tomosynthesis.

SYSTEM AND METHOD FOR ESTIMATING THE HEIGHT OF AN OBJECT USING TOMOSYNTHESIS-LIKE TECHNIQUES

TECHNICAL FIELD

Certain embodiments of the present invention relate to methods and apparatus for characterizing dimensions of objects. More particularly, certain embodiments of the present invention relate to methods and apparatus for ascertaining three-dimensional measurements of objects using tomosynthesis-like techniques.

BACKGROUND

Linear tomography is a classic imaging technique (dating from the 1930s) used to create medical x-rays which are in focus at a single plane within a patient, but out of focus everywhere else. This approach may reduce confusion due to overlying (superimposed) anatomical structures, thereby improving the diagnostic utility of the x-ray. Modern versions of linear tomography using digital x-ray images (as opposed to film images) are known as tomosynthesis. A discussion of tomography and tomosynthesis is given in the article "Digital computed laminography and tomosynthesis—functional principles and industrial applications" by S. Gondrom et al., NDT.net, July 1999, Vol. 4 No. 7, parts of which are paraphrased and summarized in the background section herein.

X-ray irradiation is well known as a non-destructive testing method for technical components. Unfortunately, using simple irradiation techniques, there is no possibility to get information about the depth of the imaged structures. In 1932 de Plantes performed first experiments to image an object layer by layer. The technique was called laminography and was used in medical diagnostics. Furthermore the development of computed tomography (CT) allowed a nondestructive imaging of object slices, but with the restriction that the objects have to be irradiated from the full angular region. Because of high absorption and limited access, this is not always possible, e.g. in the case of flat components as multi-layer printed circuit boards or welding seams in big components.

Laminographic methods are able to overcome these difficulties. They yield images of object slices and allow the determination of the position of the object structures.

Classical laminography is based on a relative motion of the x-ray source, the detector and the object. The x-ray source and the detector are either moved synchronously on circles or are simply translated in opposite directions. Due to that correlated motion, the location of the projected images of points within the object moves also. Only points from a particular slice, the so called focal slice, are projected always at the same location onto the detector and therefore imaged sharply. Object structures above and below the focal slice are projected at different locations. Because of that, they aren't imaged sharply and are superimposed as a background intensity to the focal slice. This principle of superimposing projections is called tomosynthesis.

Of course rotational laminography needs a more complicated mechanical scanning system than translational laminography, however, it yields better results, because of the bigger angular region from which projections are obtained.

The main disadvantages of classical laminography are the background intensity that reduces the contrast resolution, the complicated mechanical scanning system and the fact that, in each measurement, only one slice is imaged sharply. All other slices have to be inspected consecutively by displacing the object vertically.

The only difference between digital and classical laminography is the use of a digital x-ray detector so that a series of discrete projections may be digitally stored. Nevertheless, this helps to overcome some of the above mentioned disadvantages. For example, all object layers may be obtained with only one measurement by sorting the data. Therefore, it becomes possible to test objects 3-dimensionally within acceptable times. Moreover, there is the possibility to reconstruct the projection data measured under many angles using well known CT reconstruction algorithms like the Algebraic Reconstruction Technique (ART). This leads to a higher contrast resolution and overcomes the smearing out effect of simple tomosynthesis, but needs more time.

The Fraunhofer Institute Nondestructive Testing IZFP developed a laminographic method, named computed laminography (CL), which only requires a simple linear translation of the object through the fan beam of an x-ray source. Both the x-ray source and the detector remain stationary. Alternatively, the object may remain stationary and the x-ray source and the detector may be moved synchronously but without a relative movement. Therefore, it becomes very simple to examine e.g. large and heavy objects that normally cannot be easily examined with classical laminography because of the complicated mechanical system set-up.

During the movement, the object is irradiated by the x-rays under different angles due to the fan beam with an opening angle θ. Therefore, the elements of the detector get successive information of a given volume element of the object under consecutively changing angles and these digital projections contain the complete structure information of all object slices. To obtain cross sections comparable to classical laminography, the projection values simply have to be sorted and added correctly.

CL is equivalent to a CT with a limited angular region, allowing the use of special CT reconstruction algorithms like ART to enhance contrast resolution. Additionally, it is possible to integrate 'a priori' information to these algorithms reducing the reconstruction time and the artifacts caused by the limited angular region and leading to a higher image quality.

Artifacts arise because projections are only obtained from a small aperture. This reduces furthermore the geometrical resolution compared with a traditional CT. There is a dependence of the ratio of the axial to lateral resolution as a function of the fan beam opening angle. The axial resolution, that is in line with the x-rays, is always smaller than the lateral resolution, perpendicular to this direction.

Besides the several possibilities in acquiring data with laminographic methods, large differences may be achieved in the quality of reconstructed cross sections by varying the reconstruction method. A simple tomosynthesis yields results in a relatively short time, but normally the cross sections are blurred and only few details with high contrast are visible. Using, for example, ART, which is an iterative reconstruction technique, more time is needed but more details may be seen.

Digital laminography is a suitable method to examine flat components like printed circuit boards or welding seams. For the examination of printed circuit boards, there even exist several industrial systems like e.g. the Feinfocus µ-3D Visualiser or the HP 5DX Series II, formerly known as the Four Pi System.

Laminographic methods turn out to be excellent x-ray methods for the inspection of flat components like printed circuit boards or welding seams in big and flat components.

Compared with classical laminography, the use of digital x-ray detectors has a lot of advantages and makes it possible to use digital laminography as a modern industrial NDT method.

It may be possible to apply modified versions of such techniques using visible light spectrum imaging devices as well.

Further limitations and disadvantages of conventional, traditional, and proposed approaches will become apparent to one of skill in the art, through comparison of such systems and methods with embodiments of the present invention as set forth in the remainder of the present application with reference to the drawings.

SUMMARY

An embodiment of the present invention comprises a method to estimate the height profile of an object. The method includes acquiring a plurality of raw images of an object to be characterized using at least one imaging device. The plurality of raw images are representative of a plurality of spatial shifts of the imaging device relative to the object to be characterized. The method further includes processing the plurality of raw images to generate a plurality of composite images. Each composite image corresponds to a unique image shift between spatially adjacent raw images and is made up of a plurality of image pixel locations. The unique image shift may be a fraction of the distance between two adjacent image pixel locations. Processing the plurality of raw images may include using a sub-pixel location interpolation technique to generate the plurality of composite images. The method also includes calculating a volatility parameter value within a neighborhood of at least one same image pixel location of the plurality of image pixel locations for each of the plurality of composite images. The method further includes determining which composite image has a largest volatility parameter value for the image pixel location. As an option, the method may include filtering the volatility parameter value across the plurality of composite images for the same image pixel location before determining which composite image has the largest volatility parameter value for the image pixel location. The method also includes transforming the unique image shift, corresponding to the composite image having the largest volatility parameter value, into a height value representative of a height dimension of the image pixel location. The method may further include spatially translating the imaging device relative to the object to be characterized during acquisition of the plurality of raw images, or spatially translating the object to be characterized relative to the imaging device during acquisition of the plurality of raw images. The method may also include generating a height value for each image pixel location of the plurality of image pixel locations to form a height profile image of the object to be characterized and displaying the height profile image. The method may further include comparing the height profile image to at least one reference image to find any defects that are present in the object to be characterized.

Another embodiment of the present invention comprises a system to estimate the height profile of an object. The system includes means for acquiring a plurality of raw images of an object to be characterized. Each of the plurality of raw images is acquired at a unique spatial location relative to the object to be characterized. The system further includes means for processing the plurality of raw images to generate a plurality of composite images. Each composite image corresponds to a unique image shift between spatially adjacent raw images and is made up of a plurality of image pixel locations. The system also includes means for calculating a volatility parameter value within a neighborhood of at least one same image pixel location for each of the composite images. The system further includes means for determining which composite image has a largest volatility parameter value for the image pixel location. The system may optionally include means for filtering the volatility parameter value across the plurality of composite images for the same image pixel location before determining which composite image has the largest volatility parameter value for the image pixel location. The system further includes means for transforming the unique image shift, corresponding to the composite image having the largest volatility parameter value, into a height value representative of a height dimension of the image pixel location. The system may also include means for spatially translating the means for acquiring relative to the object to be characterized during acquisition of the plurality of raw images, or means for spatially translating the object to be characterized relative to the means for acquiring during acquisition of the plurality of raw images. The system may further include means for generating a height value for each image pixel location of the plurality of image pixel locations to form a height profile image of the object to be characterized and means for displaying the height profile image. The system may also include means for comparing the height profile image to at least one reference image to find any defects that are present in the object to be characterized.

A further embodiment of the present invention comprises an apparatus to estimate the height profile of an object. The apparatus includes at least one imaging device capable of acquiring each of a plurality of raw images of an object to be characterized at a unique spatial relation to the object. The apparatus further includes a vision engine operatively connected to the imaging device. The vision engine is capable of processing the plurality of raw images to generate a plurality of composite images. Each composite image corresponds to a unique image shift between spatially adjacent raw images and is made up of a plurality of image pixel locations. The vision engine is further capable of calculating a volatility parameter value within a neighborhood of at least one same image pixel location of the plurality of image pixel locations for each of the composite images. The vision engine is also capable of determining which composite image has the largest volatility parameter value for the same image pixel location. As an option, the vision engine may be capable of filtering the volatility parameter value across the plurality of composite images for the same image pixel location before determining which composite image has the largest volatility parameter value for the image pixel location. The vision engine is further capable of transforming the unique image shift, corresponding to the composite image having the largest volatility parameter value, into a height value representative of a height dimension of the image pixel location. The system may further include a spatial translation mechanism operatively connected to the imaging device and to the vision engine, and capable of spatially translating the imaging device relative to the object to be characterized. The system may alternatively include a spatial translation mechanism capable of spatially translating the object to be characterized relative to the imaging device. The vision engine may be further capable of generating a height value for each image pixel location of the plurality of image pixel locations to form a height profile image of the object to be characterized. The system may also include a display operatively connected to the vision engine and capable of displaying the height profile image. The vision engine may also be capable of comparing the height profile image to at least one reference image to find any defects that are present in the object to be characterized.

Another embodiment of the present invention comprises a method to estimate the dimensions of a cuboid. The method includes (a) acquiring a plurality of raw images of a cuboid using at least one imaging device, where the plurality of raw images are representative of a plurality of spatial shifts of the at least one imaging device relative to the cuboid; (b) processing the plurality of raw images to generate a composite image, where the composite image corresponds to a unique image shift between spatially adjacent raw images and is made up of a plurality of image pixel locations; (c) analyzing the composite image in an attempt to find upper-most edges of the cuboid in the composite image; (d) repeating steps (b) and (c) using a different unique image shift until the upper-most edges of the cuboid are found; and (e) transforming the unique image shift, corresponding to the composite image in which the upper-most edges of the cuboid have been found, into an estimated height of the cuboid. The method may further include spatially translating the at least one imaging device relative to the cuboid during acquisition of the plurality of raw images. The method may alternatively further include spatially translating the cuboid relative to the at least one imaging device during acquisition of the plurality of raw images. The method may also include estimating the length and width of the cuboid using at least the estimated height of the cuboid and a similar triangles technique. The method may further include estimating a volume of the cuboid using the estimated height, the estimated length, and the estimated width of the cuboid.

A further embodiment of the present invention comprises a system to estimate the dimensions of a cuboid. The system includes means for acquiring a plurality of raw images of a cuboid, where each of the plurality of raw images is acquired at a unique spatial location to the cuboid. The system further includes means for processing the plurality of raw images to generate a composite image, where the composite image corresponds to a unique image shift between spatially adjacent raw images and is made up of a plurality of image pixel locations. The system also includes means for analyzing the composite image in an attempt to find upper-most edges of the cuboid in the composite image. The system further includes means for transforming the unique image shift, corresponding to the composite image in which the upper-most edges of the cuboid have been found, into an estimated height of the cuboid. The system may further include means for spatially translating the means for acquiring relative to the cuboid during acquisition of the plurality of raw images. The system may alternatively further include means for spatially translating the cuboid relative to the means for acquiring during acquisition of the plurality of raw images. The system may also include means for estimating a length and a width of the cuboid using at least the estimated height of the cuboid and a similar triangles technique. The system may further include means for estimating the volume of the cuboid using the estimated height, the estimated length, and the estimated width of the cuboid.

Another embodiment of the present invention comprises an apparatus to estimate the dimensions of a cuboid. The apparatus includes at least one imaging device capable of acquiring each of a plurality of raw images of a cuboid at a unique spatial relation to the cuboid. The apparatus further includes a vision engine operatively connected to the at least one imaging device and capable of: (a) processing the plurality of raw images to generate a composite image, where the composite image corresponds to a unique image shift between spatially adjacent raw images and is made up of a plurality of image pixel locations, (b) analyzing the composite image in an attempt to find upper-most edges of the cuboid in the composite image, (c) repeating steps (a) and (b) using a different unique image shift until the upper-most edges of the cuboid are found, and (d) transforming the unique image shift, corresponding to the composite image in which the upper-most edges of the cuboid have been found, into an estimated height of the cuboid. The apparatus may further include a spatial translation mechanism operatively connected to the at least one imaging device and to the vision engine, and capable of spatially translating the at least one imaging device relative to the cuboid. The apparatus may alternatively also include a spatial translation mechanism capable of spatially translating the cuboid relative to the at least one imaging device. The vision engine may further be capable of estimating a length and a width of the cuboid using at least the estimated height of the cuboid and a similar triangles technique, and estimating a volume of the cuboid using the estimated height, the estimated length, and the estimated width of the cuboid.

These and other advantages and novel features of the present invention, as well as details of illustrated embodiments thereof, will be more fully understood from the following description and drawings.

DETAILED DESCRIPTION

Figure 1:
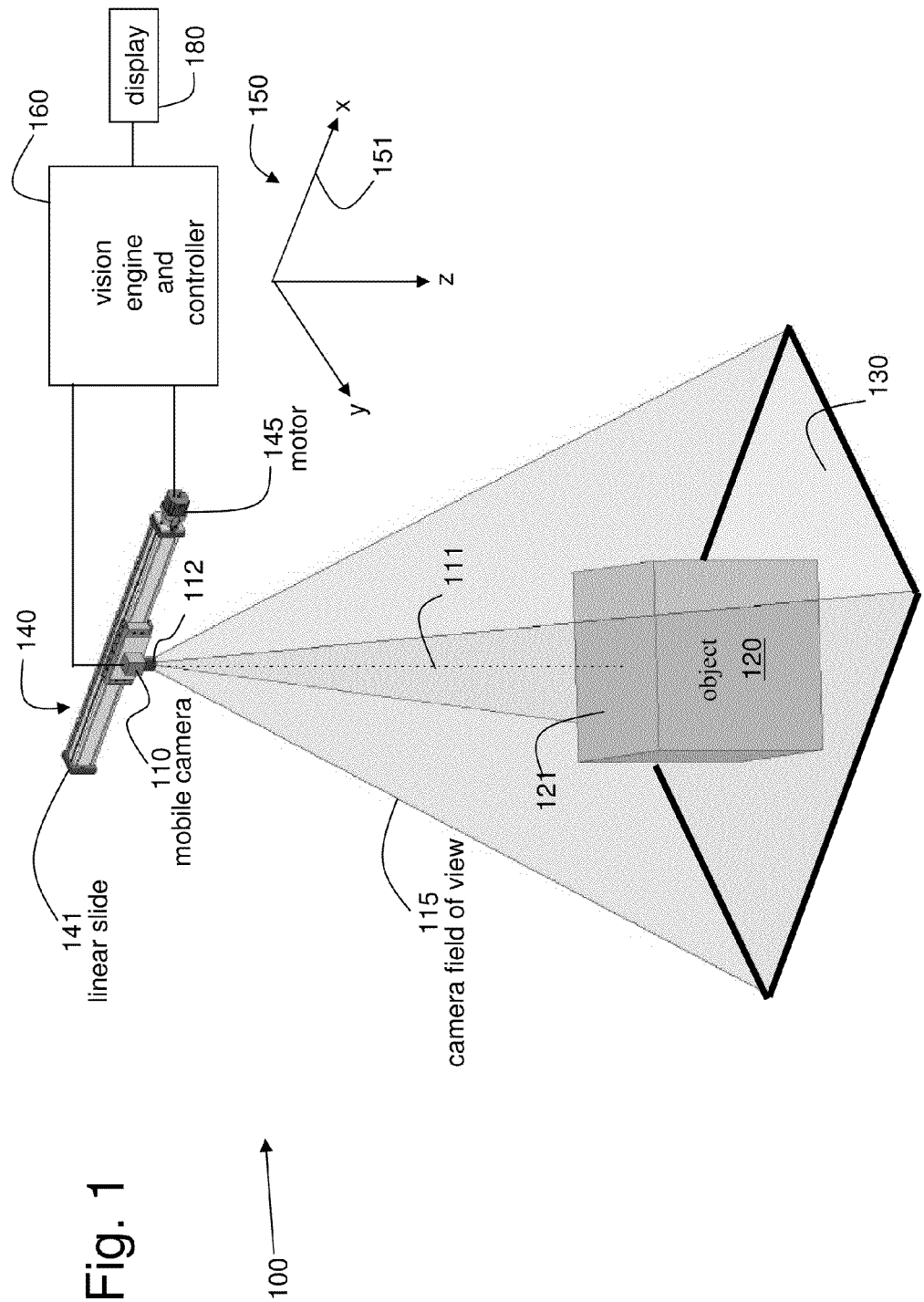
FIG. 1 illustrates a first exemplary embodiment of a system for height estimation using tomosynthesis-like techniques with a single moving camera above a stationary object.

Embodiments of the systems and methods described herein provide automatic measurement (estimation) of a height dimension of an object to be characterized such as, for example, a top surface of a cuboid or box-like object (e.g., a cardboard box or package) or lids of cans, using tomosynthesis-like techniques. In some embodiments, the volume of the object may also be estimated. FIG. 1 illustrates a first exemplary embodiment of a system 100 for height estimation using tomosynthesis-like techniques. For example, in accordance with an embodiment of a method herein, an operator places an object 120 to be measured on a measurement table 130. An imaging device (e.g., a video camera 110, monochrome or color) is located above the object 120, looking down on the top 121 of the object 120, with the camera optical axis 111 perpendicular to a table top 130 upon which the object 120 rests. The camera 110 has a lens 112 with a field-of-view 115 adequate to see the entire top surface 121 of the largest object the system 100 is designed to measure. The region bounded by this largest object is called the measurement volume. In certain environments, a color camera may provide more discrimination between the object edges and the background than a monochrome camera.

The camera 110 is spatially translated horizontally by means of a spatial translation mechanism 140 (e.g., a continuous or stepped motor drive, servo, screw or linear slide 141 having a motor 145) along a line (defined as the x-axis 151 of a right-handed Cartesian coordinate system xyz 150), and a sequence of equally-spaced images is acquired, each at a unique spatial location relative to the object to be characterized 120. The translation mechanism 140 is operated by a vision engine and controller 160 which operationally interfaces to the translation mechanism 140. The acquired images are referred to as raw images. The optics of the camera 110 are such that each raw image is substantially in focus over the entire measurement volume, in accordance with an embodiment of the present invention. Alternatively, distortion correction may be performed on the acquired images.

The processing and control corresponding to the various methods and algorithms described herein may be performed by a vision engine 160 which may or may not be built-in to an enclosed system including the single camera. Such a vision engine and controller 160 may take the form of a digital signal processor or a software-controlled processor, for example, in order to receive and process acquired images as described herein to estimate height dimensions as well as to control the camera 110 (e.g., spatial translation and acquisition trigger) and a lighting device. Alternatively, the processing corresponding to the various methods and algorithms described herein may be performed by a personal computer (PC), for example, serially linked to the single camera. Such a PC may send commands to control a light source (ON/OFF sequence) and the camera translation, and may receive and process acquired images as described herein to estimate height dimensions.

Figure 2:
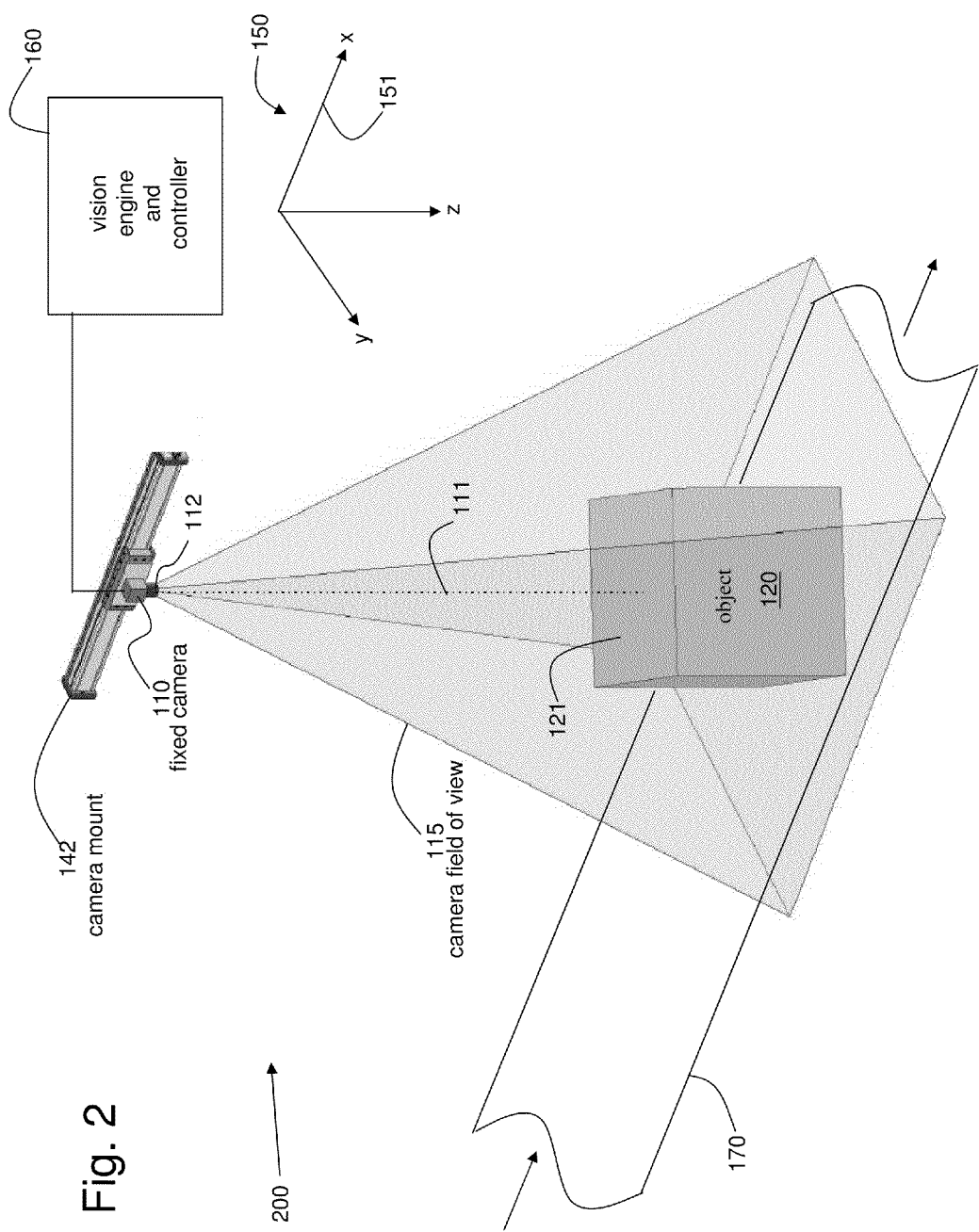
FIG. 2 illustrates a second exemplary embodiment of a system for height estimation using tomosynthesis-like techniques with an object moving under a single stationary camera.

As an alternative, the single camera 110 may be stationary (mounted on a camera mount 142) as in the system 200 of FIG. 2, and the object 120 may be moved beneath the camera 110 as images are acquired (e.g., on a conveyor belt 170). Similarly, as a further alternative, a plurality of cameras 110' may be provided, as in the system 300 of FIG. 3, which are spaced apart along a horizontal axis on a camera mount 143 above the object 120. Each camera 110 of the plurality of cameras 110' acquires a single image of the object 120 at its unique spatial position. With each alternative (moving camera and fixed object, fixed camera and moving object, multiple fixed cameras and fixed object), an effective relative motion is provided between the object 120 and the position from which each image is acquired. Ambient light may be used during image acquisition or, alternatively, a strobe light may be used during image acquisition which is synchronized to the image capture trigger of the camera(s) 110.

In accordance with certain embodiments of the present invention, the imaging device may be a high-speed imaging device (e.g., a high-speed CMOS camera) capable of acquiring images at rates of hundreds or possibly thousands of images per second. Other types of imaging devices are possible as well, in accordance with certain other embodiments of the present invention. For example, another type of imaging device may include a thermal imaging device.

Figure 3:
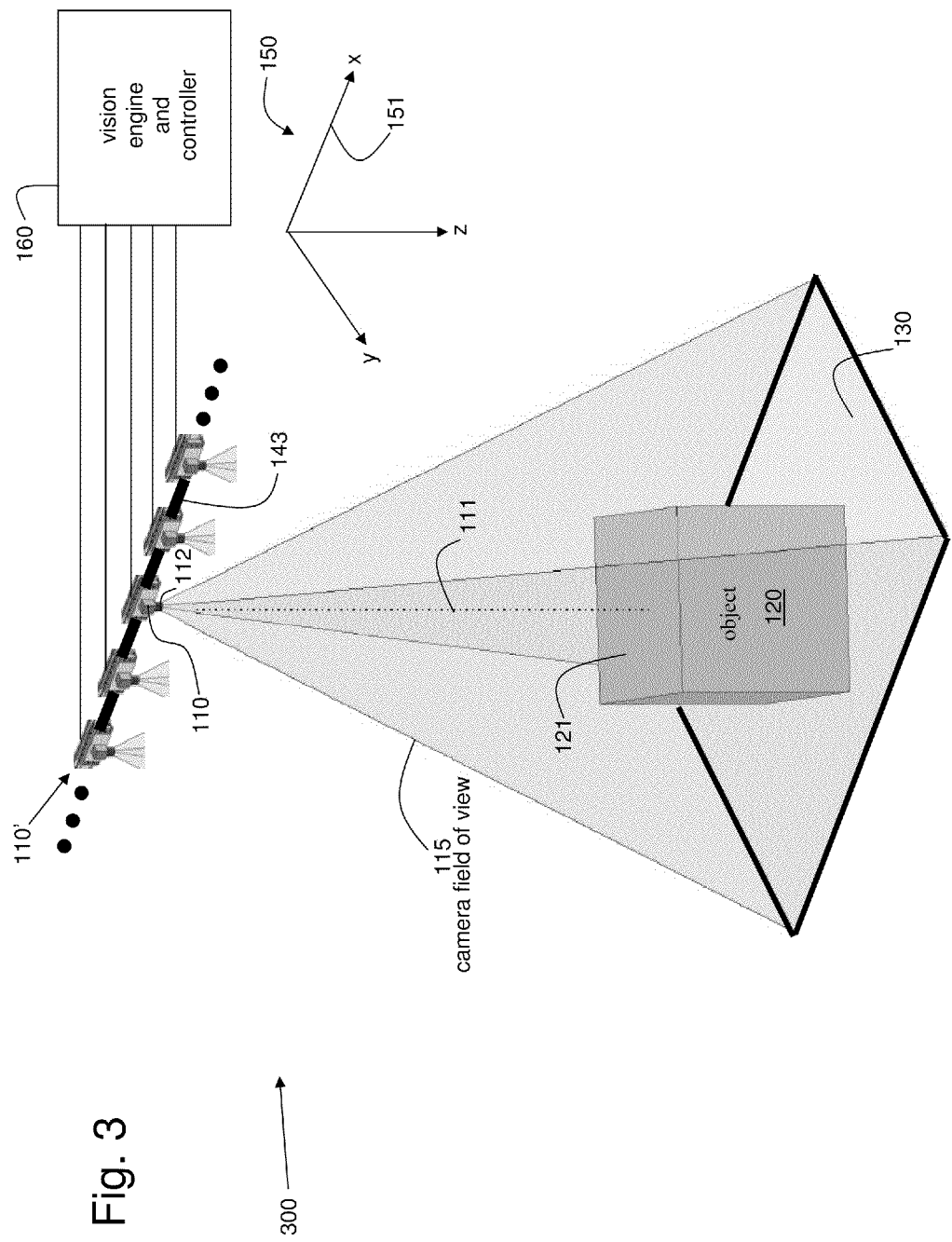
FIG. 3 illustrates a third exemplary embodiment of a system for height estimation using tomosynthesis-like techniques with multiple stationary cameras above a stationary object.

Now consider how the systems of FIGS. 1-3 may each be used to determine a height profile of an object to be characterized. Let $I_n(p,q)$ represent the value of the pixel at column p of row q of raw image n, where $n=0, \pm 1, \pm 2, \ldots, \pm N$. The position of the camera pinhole when image n is acquired is $x_n = n\delta$, where $\delta$ is the inter-image camera spacing. For purposes of analysis, it is convenient to model a real camera as a pinhole camera. The errors introduced by this assumption are typically small. The total number of raw images acquired is $2N+1$. The origin of the Cartesian coordinate system 150 is taken to be the location of the pinhole when $n=0$, and the z axis points down toward the top of the object to be characterized, perpendicular to the table top 130 or conveyor belt 170. It is assumed that the image sensor rows are parallel to the x axis, the image sensor columns are parallel to the y axis, and the image sensor has square pixels.

Instead of imaging an object such as a box, consider imaging a small object (essentially a point) located at $(X, Y, Z)$ in the xyz coordinate system. Using the pinhole camera model and similar triangles, it may be shown that, in raw image n, the object has pixel coordinates $(P_n, Q_n)$, where $$P_n = p_0 + \eta(X - n\delta)/Z$$

$$Q_n = q_0 + \eta Y/Z, \quad \text{Equation (1)}$$

where $\eta$ is the camera focal length (measured in pixels), and $(p_0, q_0)$ is the principal point of the image sensor (the point where a line containing the pinhole and perpendicular to the image sensor intersects the image sensor).

Now consider creating a single composite image from the set of raw images, such that the value of the pixel at column p of row q of the composite image is $$I(p,q) = (2N+1)^{-1} \Sigma I_n(p + n\sigma, q), \quad \text{Equation (2)}$$

where the summation is over all n, and $\sigma$ represents a shift distance (image shift) (measured in pixels) along image rows between adjacent images. Equations (1) and (2) imply that the point object will, in general, appear at multiple locations in the composite image. Specifically, the point object will appear at locations $(P'_n, Q'_n)$ in the composite image satisfying $$P_n = P'_n + n\sigma \quad \text{Equation (3)}$$

$$Q_n = Q'_n.$$

Equations (1) and (3) imply $$P'_n = p_0 + (\eta X/Z) - n[\sigma + (\eta\delta/Z)]$$

$$Q'_n = q_0 + (\eta Y/Z). \quad \text{Equation (4)}$$

Equations (4) reveal a remarkable fact: if the pixel shift is selected as $$\sigma = -\eta\delta/Z, \quad \text{Equation (5)}$$

then the term inside the brackets in the first of Eqs. (4) is zero, and the image of the point object appears at just a single point in the composite image, independent of n. For all other choices of $\sigma$, the point object will be imaged at multiple locations, spanning a distance (in pixels) along the composite image rows given by $$\beta = |P'_N - P'_{-N}| = 2N|\sigma + (\eta\delta/Z)|, \quad \text{Equation (6)}$$

where the vertical bars denote absolute value. $\beta$ is referred to herein as the blur diameter and is a measure of the extent of blurring in the composite image. Note that when $\sigma$ satisfies the condition of Equation (5) there is no blurring of the point object ($\beta=0$).

Figure 4:
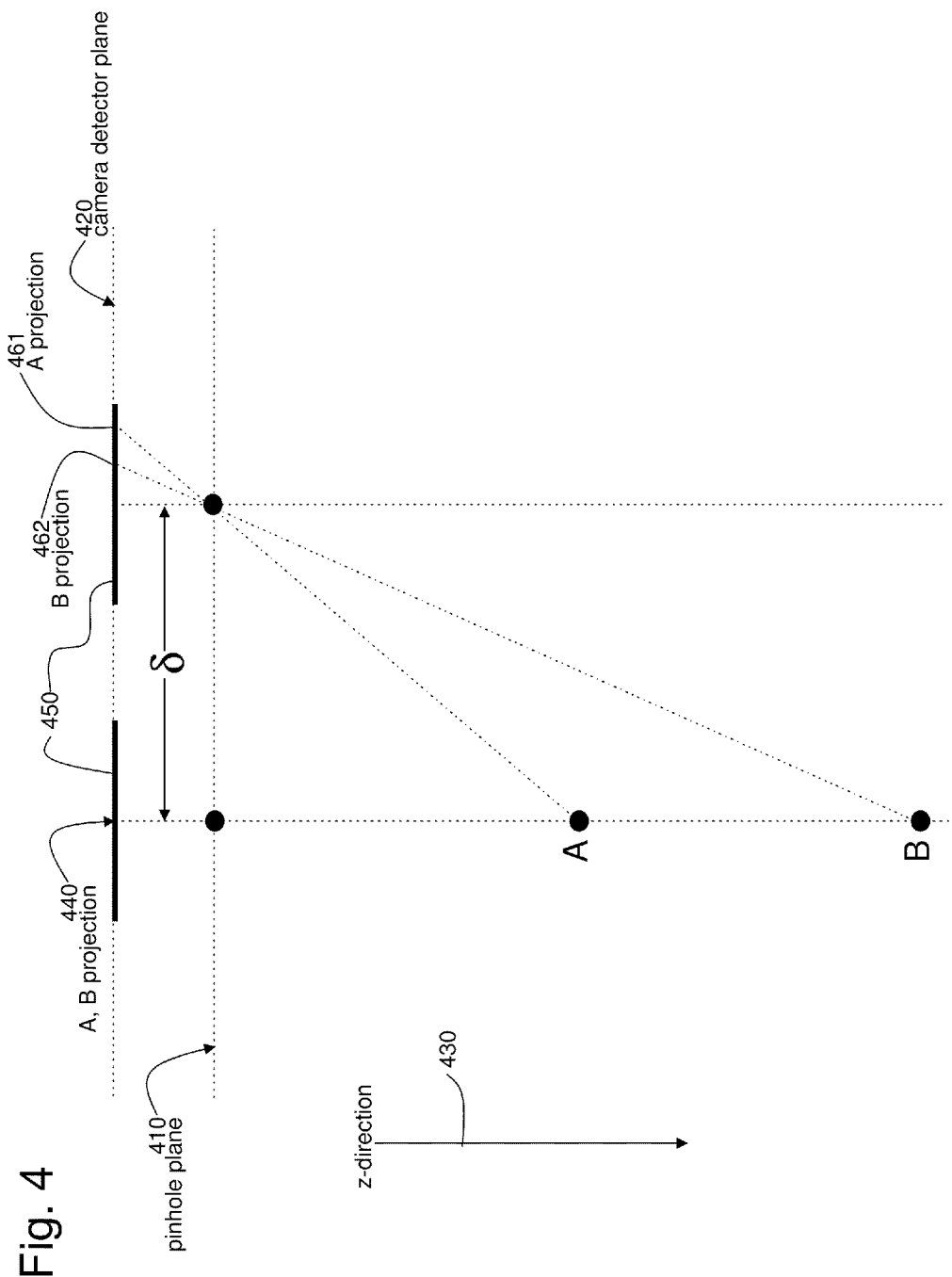
FIG. 4 illustrates the concept of tomosynthesis, in accordance with the embodiments of FIGS. 1-3.

FIG. 4 illustrates the concept of tomosynthesis. For example, referring to FIG. 4, when a camera represented by a pinhole plane 410 and a detector plane 420 is in a first position, two points A and B aligned along the optical axis of the camera in the z-direction 430 are both projected onto the same point 440 on the detector 450 of the camera. However, when the camera is shifted to the right to a second position by a distance $\delta$, the two points A and B are now projected onto the detector 450 of the camera at two different points 461 and 462. That is, there is now a separation between the projection of point A and the projection of point B in the resultant acquired image. If the camera is subsequently shifted multiple times by the distance $\delta$ from its previous position, the point A will continue to move the same amount in the detector plane 420 and the point B will continue to move the same different amount in the detector plane 420. If the resultant acquired raw images are slid or shifted by an amount such that point A is aligned in all of the acquired images then, in the resultant composite image, point A will appear in focus and point B will appear blurred. This is because, when all points A are aligned, the points B are unaligned. Similarly, if the resultant acquired raw images are slid or shifted by a different amount such that point B is aligned in all of the acquired images then, in the resultant composite image, point B will appear in focus and point A will appear blurred. Therefore, it may be seen that, by shifting the acquired images by different amounts, different discrete heights along the z-direction may be brought into focus in the composite image. For many applications, the image shift from composite image to composite image is a fractional pixel shift and linear interpolation, for example, may be used to generate fractional pixel values between integer pixel locations.

Equation (6) is the central result and reveals that, given a set of 2N+1 raw images acquired with an inter-image camera interval of $\delta$, $\sigma$ (image shift) may be selected according to the condition of Equation (5) so that all object points within the z=Z plane are in focus ($\beta=0$), while all other parallel planes are out of focus ($\beta>0$). The extent of defocusing of a given object point is given by Eq. (6), and depends on how far that point is from the z=Z plane. The above equations apply directly to the moving camera and stationary object scenario of FIG. 1. To obtain the correct equations for the moving object and stationary camera scenario of FIG. 2, simply change the sign of $\delta$ in the equations (e.g., $\delta$ changes to $-\delta$).

Figure 5:
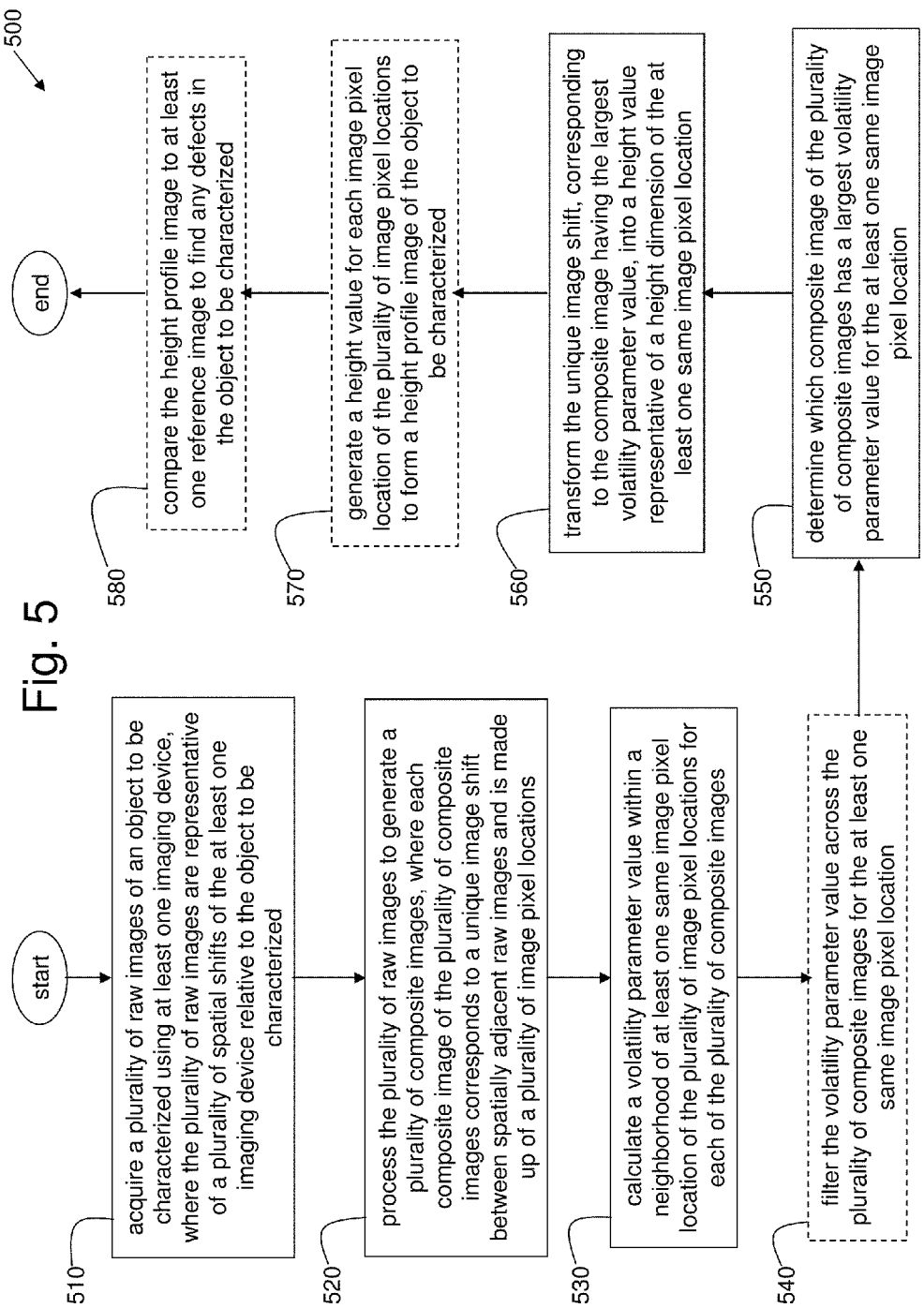
FIG. 5 is a flow chart of an example embodiment of a method to estimate the height profile of an object.

FIG. 5 is a flow chart of an example embodiment of a method 500 to estimate the height profile of an object. In step 510, acquire a plurality of raw images of an object to be characterized using at least one imaging device (e.g., a camera), where the plurality of raw images are representative of a plurality of spatial shifts of the at least one imaging device relative to the object to be characterized. In step 520, process the plurality of raw images to generate a plurality of composite images, where each composite image of the plurality of composite images corresponds to a unique image shift between spatially adjacent raw images and is made up of a plurality of image pixel locations.

In step 530 of the method 500, calculate a volatility parameter value (e.g., a standard deviation value) within a neighborhood (e.g., a predefined kernel of pixel locations, 5×5, 10×10) of at least one same image pixel location of the plurality of image pixel locations for each of the plurality of composite images. In optional step 540, filter (e.g., low-pass filter) the volatility parameter value across the plurality of composite images for the at least one same image pixel location. In step 550, determine which composite image of the plurality of composite images has a largest volatility parameter value for the at least one same image pixel location.

In step 560 of the method 500, transform the unique image shift, corresponding to the composite image having the largest volatility parameter value, into a height value representative of a height dimension of the at least one same image pixel location. In optional step 570, generate a height value for each image pixel location of the plurality of image pixel locations to form a height profile image of the object to be characterized. In optional step 580, compare the height profile image to at least one reference image to find any defects in the object to be characterized. The height profile image may be displayed on a display 180 of the system 100, for example.

Generating a height profile image with the method 500 of FIG. 5 involves determining the height of the imaged object at a large number of locations. The locations may form a square array of image pixel locations represented as an image. The height at any pixel image location is proportional to the pixel value (e.g., black=0 and white=255 in an 8-bit image).

To determine the height Z(p,q) at a given image pixel location (p,q), the value of image shift $\sigma$ is determined which brings the object into focus in the neighborhood of that image pixel location in the composite image. Then $Z(p,q)=\eta\delta/\sigma$ (see Equation (5) above). The value Z(p,q) can be offset and scaled appropriately and used as the pixel value at the image pixel location (p,q).

Assume M+1 composite images are created with values of $\sigma$ given by $$\sigma_i = \sigma_{min} + (i/M)*(\sigma_{max} - \sigma_{min}), \quad \text{Equation (7)}$$

where the index i ranges from 0 to M, and the values of $\sigma_{min}$ and $\sigma_{max}$ are chosen to span the range of heights expected over the object to be characterized.

Let s(i, p, q) be the standard deviation (one possible volatility parameter) of the pixel values in composite image i in the neighborhood of pixel (p,q). The neighborhood of the standard deviation operation is a kernel. For example, a 5 pixel by 5 pixel kernel centered on (p,q) for the standard deviation calculation may be chosen. The standard deviation tends to be relatively large for regions which are in focus, and relatively small for regions which are blurred (i.e., not in focus). At each image pixel location (p,q), the value of i which maximizes s(i, p, q) is found. Then, the height of the object at the location (p,q) is estimated as $Z(p,q)=\eta\delta/\sigma_i$. The number of raw images and the kernel size may be optimized for any particular application. The standard deviation is not the only operator (volatility parameter) capable of being useful in determining focus. Other types of operators such as, for example, a 2D spatial gradient measurement approach and a rule-based approach are possible as well.

Figure 6:
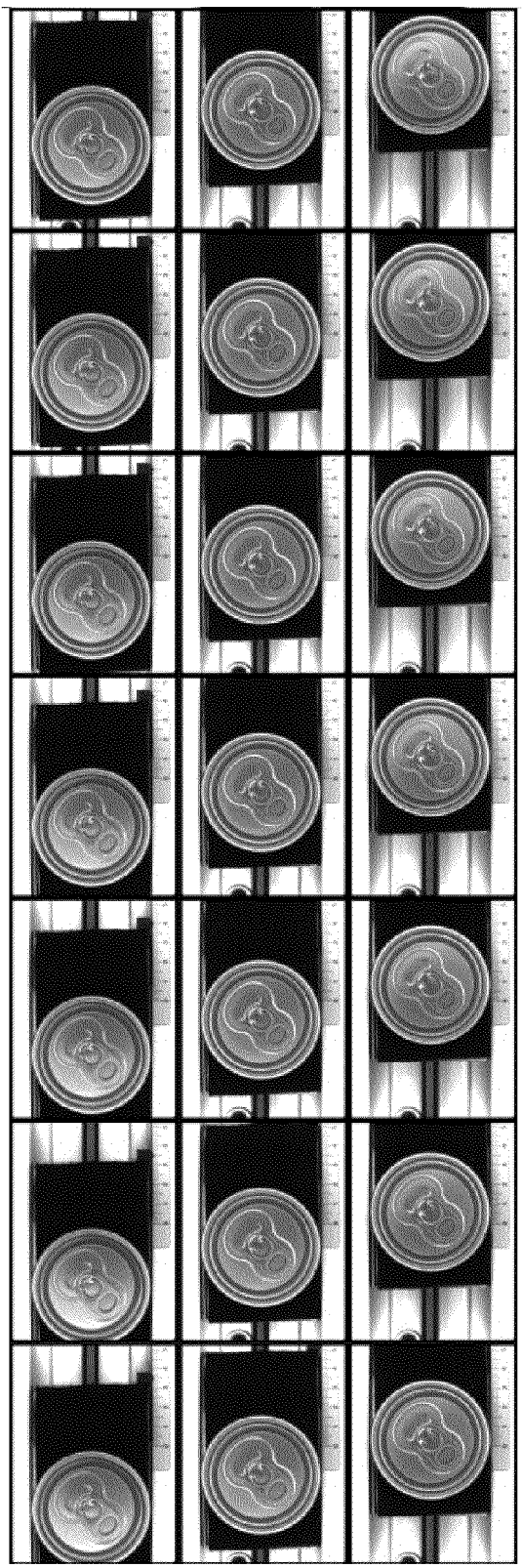
FIG. 6 illustrates an example embodiment of a plurality of raw images acquired using the system of FIG. 1.

FIG. 6 illustrates an example embodiment of a plurality of twenty-one raw images 600 acquired using the system 200 of FIG. 2. The raw images 600 are that of a lid of a soda can and were acquired by the fixed camera 110 of FIG. 2 with a spacing of $\delta$ between adjacent soda can lid acquisition positions. Each of the raw images is substantially in focus. Of course, the raw images could have been acquired using the system 100 of FIG. 1 or the system 300 of FIG. 3 as well. When capturing raw images, care is taken to minimize distortion across the field-of-view 115 such as, for example, barrel distortion or pin-cushion distortion which can appear in images. In accordance with an embodiment of the present invention, a low distortion lens 112 is used to minimize distortion. In accordance with another embodiment of the present invention, distortion produced by the lens 112 is measured and the resultant distortion in the raw images is subsequently taken out by performing distortion correction on the raw images.

Figure 7:
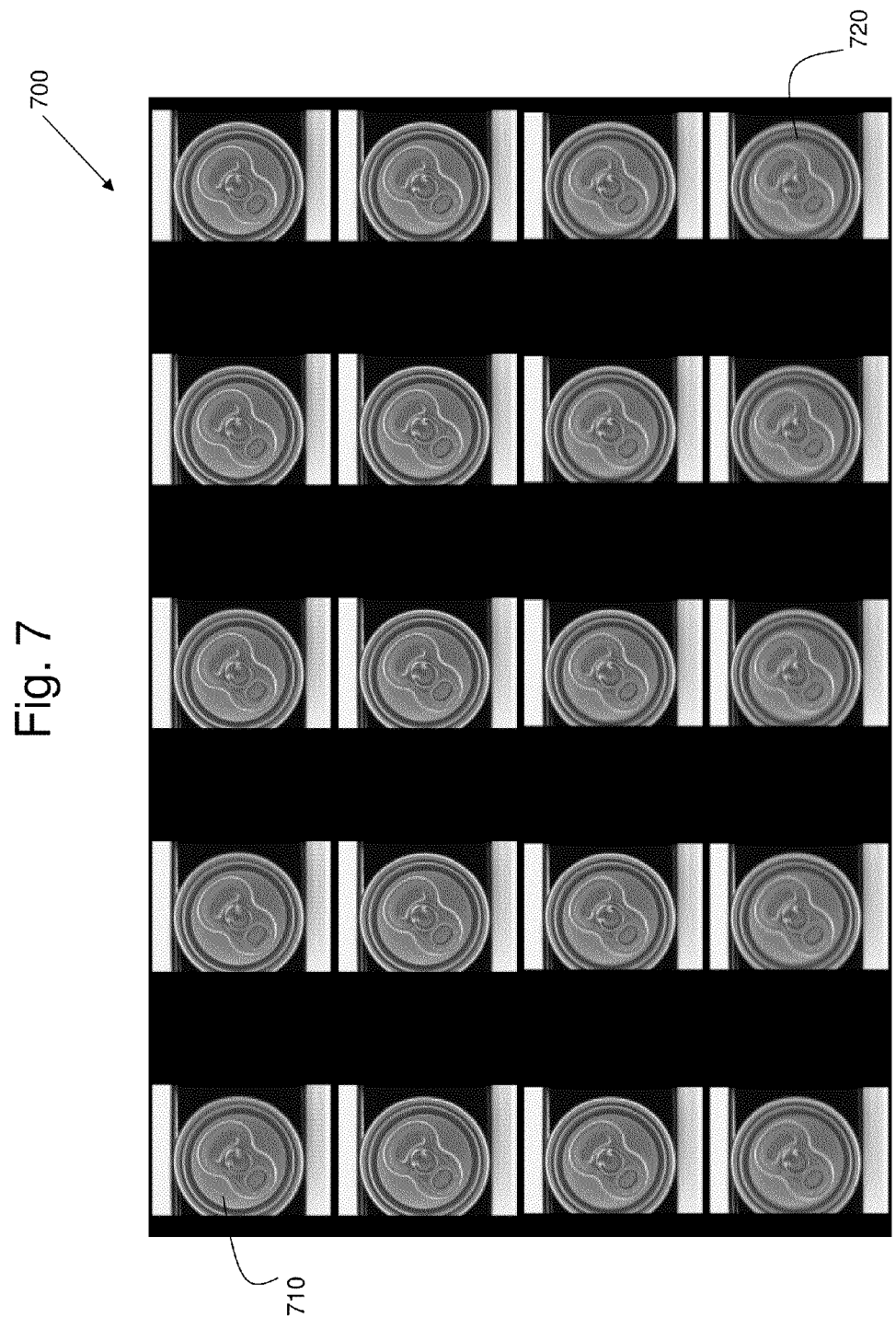
FIG. 7 illustrates an example embodiment of a plurality of composite images generated from the raw images of FIG. 6.

FIG. 7 illustrates an example embodiment of a plurality of twenty composite images 700 generated from the twenty-one raw images 600 of FIG. 6. Each composite image is generated from all twenty-one raw images 600 by applying a unique image shift σ to the raw images before integrating the raw images to form the composite image according to Equation (2). For any particular same image pixel location in the composite images, one of the composite images will be most in focus for that image pixel location. The techniques described above are used to find that in-focus composite image and its corresponding unique image shift σ. For the composite images of FIG. 7, the total image shift from the first composite image 710 to the last composite image 720 is only about 2 pixels since sub-pixel interpolation is being used.

When shifting images to generate a composite image, sub-pixel interpolation may be employed for non-integer values of σ. The composite image may have real number (floating point) pixel values to avoid introducing rounding errors to the composite image. Such sub-pixel interpolation can provide improved z-axis accuracy. Alternatively, the composite image may be an integer value image with more bits per pixel than the raw images.

Figure 8:
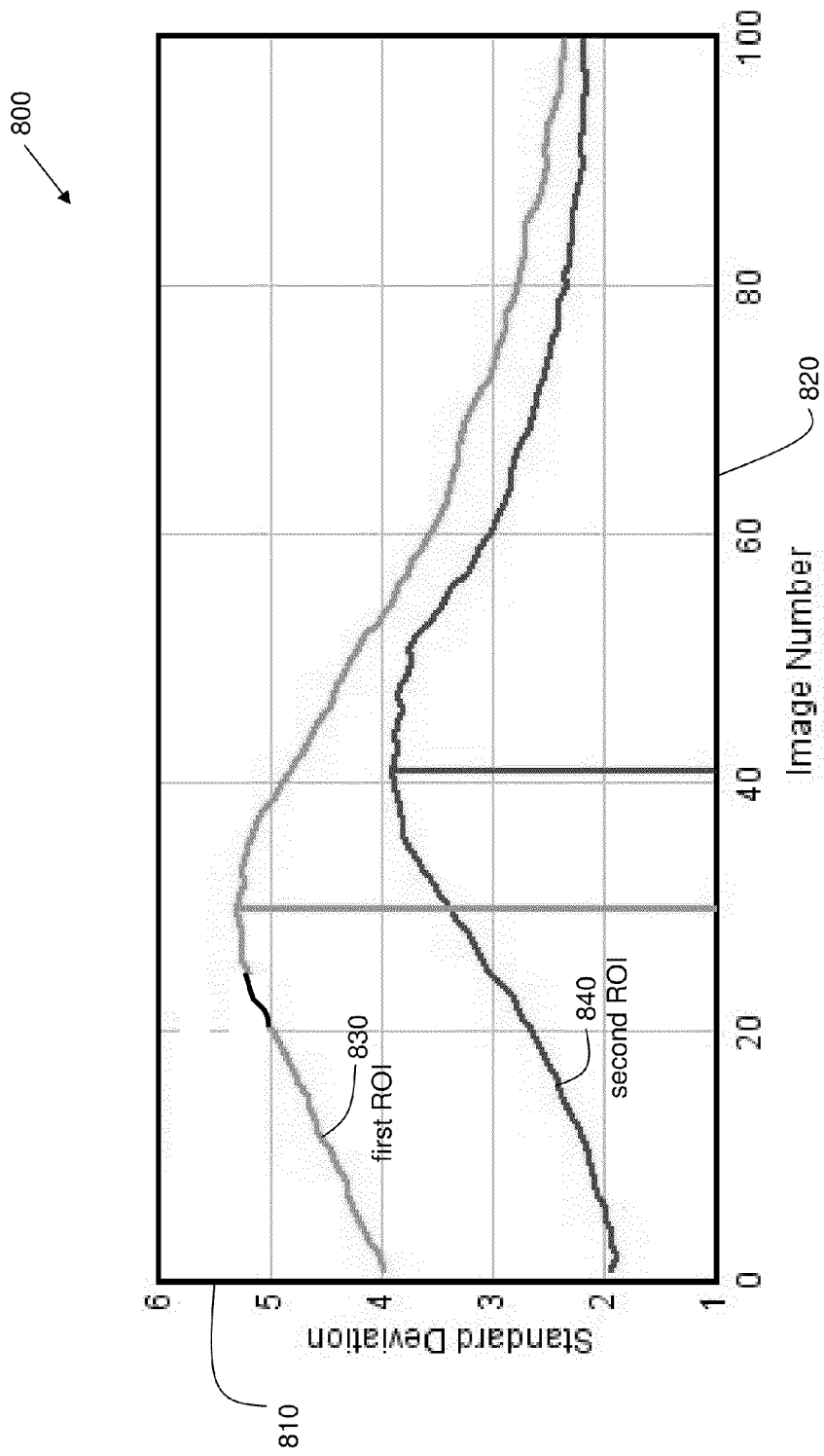
FIG. 8 illustrates an example plot of standard deviation versus composite image number for two example regions of interest in the composite images of FIG. 7.

FIG. 8 illustrates an example plot 800 of standard deviation 810 versus composite image number 820 for two example regions of interest (ROI) 830 and 840 in the composite images 700 of FIG. 7. Simply finding the maximum of the raw standard deviation s(i, p, q) in order to determine the in-focus value of i may not always be the optimal approach. The plot 800 may be somewhat noisy (bumpy), leading to errors in determining the true maximum standard deviation. It may be prudent, as in step 540 of the method 500, to smooth the standard deviation data (volatility parameter values), via filtering, across the composite images to obtain a more accurate estimate of the value of i for the true maximum.

Figure 9B:
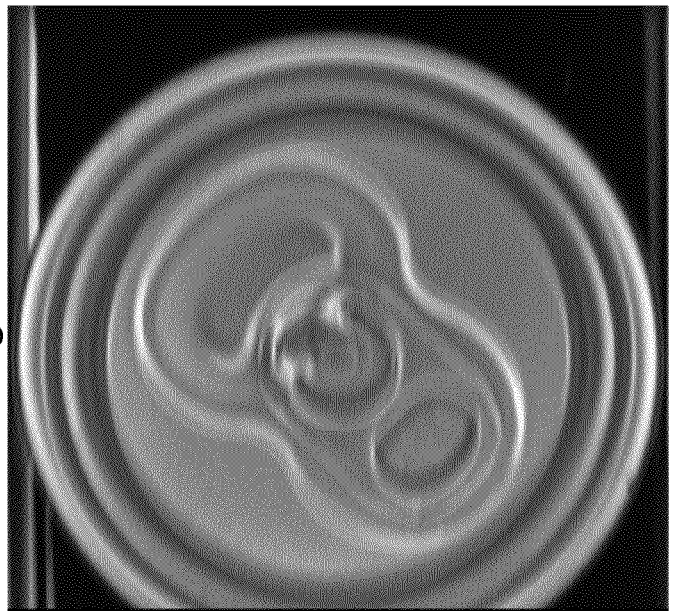
FIG. 9B illustrates an enlargement of the last composite image of FIG. 7.
Figure 9A:
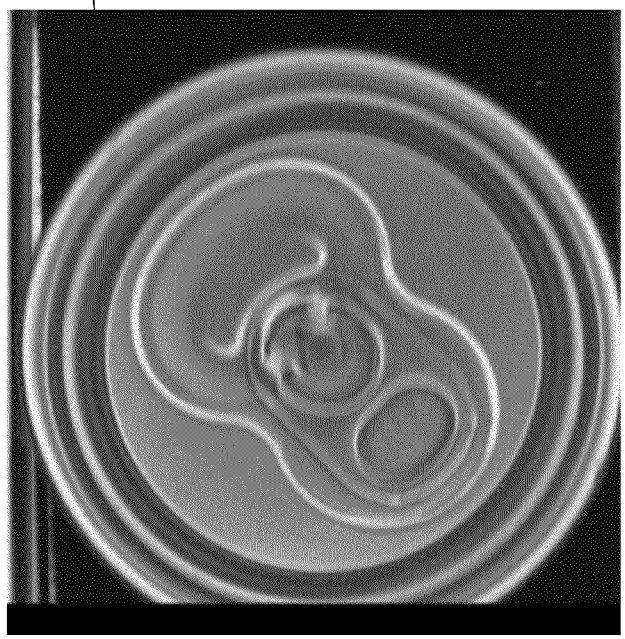
FIG. 9A illustrates an enlargement of the first composite image of FIG. 7.

FIG. 9A illustrates an enlargement of the first composite image 710 of FIG. 7. FIG. 9B illustrates an enlargement of the last composite image 720 of FIG. 7. Upon inspection, it can be seen that the first composite image 710 is substantially more in focus than the last composite image 720 for most image pixel locations, indicating that the unique image shift σ corresponding to first composite image 710 brings the soda can lid into focus better than the unique image shift σ corresponding to the last composite image 710. A better estimate of the overall height of the soda can lid would thus be obtained using the unique image shift σ corresponding to the first composite image 710 in the equation $Z(p,q)=\eta\delta/\sigma$. However, to accurately estimate the height for any particular image pixel location, each image pixel location is to be considered separately according to the method 500 of FIG. 5.

Figure 10:
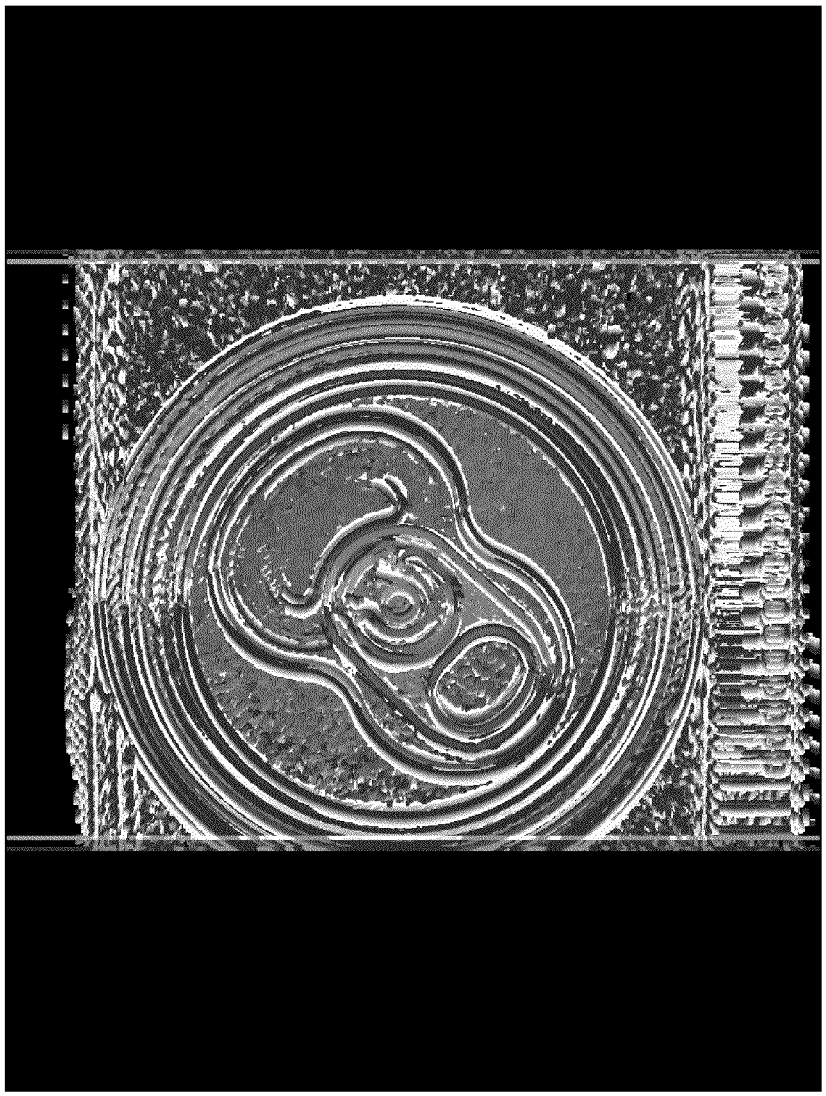
FIG. 10 illustrates an example embodiment of a height profile image generated from the raw images of FIG. 6 using the method of FIG. 5.

FIG. 10 illustrates an example embodiment of a height profile image 1000 generated from the raw images 600 of FIG. 6 using the method 500 of FIG. 5. The height or elevation is proportional to image brightness, with light image pixel locations being higher than dark image pixel locations. Although the height profile image 1000 is of somewhat poor quality (primarily because the system 100 is not optimized for the object to be characterized, as the object to be characterized is very thin compared to its distance from the camera and has a complex topography), the height profile image 1000 demonstrates the feasibility of the technique described herein.

The final height profile image may be lower in resolution than the resolution of the composite images, in accordance with an embodiment of the present invention. For example, if a 5 pixel by 5 pixel kernel is used to find the height of a pixel, the same 5×5 pixel kernel may be used to average the final height image. Furthermore, a median filter may be used to eliminate artifacts in the height profile image (to eliminate outliers).

A height profile image may be used in various applications such as, for example, object inspection and object dimensioning. For example, a height profile image may be compared to a stored reference image to find any defects in an object to be characterized. A height profile image may be used to find non-uniformities in objects that are supposed to be flat. A height profile image could be saved as a computer-aided design (CAD) file for subsequent use in manufacturing.

The above described systems may also be used to estimate the volume of a cuboid object (e.g., a box to be shipped) as well. Suppose the measurement volume is D×D×D and the distance from the pinhole to the table top is $Z_{max}$ (typically $Z_{max} \approx 3D$). And suppose a set of 2N+1 raw images of a box are acquired. (A typical number may be, for example, 19 raw images, corresponding to N=9). σ is regarded as a function of Z [$\sigma=\sigma(Z)$; see Eq. (5)] and start with a value of $\sigma=\sigma(Z_{max}-D)$ corresponding to the top surface of the measurement volume, then use Eq. (2) to create a composite image. This composite image is in focus at the top of the measurement volume, but out of focus everywhere else. A search for crisp (in focus) edges within the composite image is performed by analyzing the composite image. If none are found, then another composite image is created corresponding to $\sigma=\sigma(Z_{max}-D+d)$, where 0<d<<D. This composite image is in focus a distance d below the top of the measurement volume. Again search for crisp (in focus) edges within the composite image, and again, if none are found, create another composite image corresponding to $\sigma=\sigma(Z_{max}-D+2d)$ and search for crisp edges within it. Continue this procedure (stepping by the small distance d down from the top of the measurement volume) and eventually, after k steps, the top of the box comes into focus, and the upper-most edges of the top of the box are found. Now it is known that the top of the box is a distance $Z_{max}-D+kd$ from the pinhole. The height C of the box is found by transforming the unique image shift $\sigma_{focus}$, corresponding to the composite image in which the upper-most edges of the cuboid have been found, as $$C=D-kd, \text{ where } \sigma_{focus}=\sigma(Z_{max}-D+kd) \quad \text{Equation (7)}$$

If a and b are the lengths of the edges of the box top in the image (that is, a and b are measured in pixels), then the corresponding actual edge lengths A and B may be estimated by using similar triangles:

$$A=a(Z_{max}-C)/\eta$$

$$B=b(Z_{max}-C)/\eta. \quad \text{Equation (8)}$$

Now that A, B and C are known, the volume is given by V=ABC.

It is important to understand that the embodiments of the present system and methods described herein give two distinct advantages over a simple single-image technique. First, if only a single image of the top of the box is acquired, then it is impossible to determine the height of the box. This is due to the fact that the mapping of a point in 3 dimensions onto a point in a 2-dimensional image is not unique: an infinite number of different 3-dimensional points map onto the same image point. Second, in a single image (which is essentially in focus over the entire measurement volume) it is difficult to automate the finding of the edges of the box top, particularly if the image background (the table top and surrounds) has a complex appearance. For commercial success, a box volume measurement system should be compatible with point-of-sale environments with complex backgrounds and uncontrolled ambient lighting conditions. By blurring the background, the tomosynthesis-like technique makes automated finding of the box top edges more robust.

Because the top of a box intended for shipping is often of complex appearance (with labels, tape, decoration, etc.), the algorithm used to find the edges of the box top may search for only the outermost edges. Since the tomosynthesis technique blurs the background, this is accomplished by scanning radially from the periphery of the composite image towards the center of the image and keeping only the first edges found along each radial scan line. This collection of edge points is then used to estimate the locations and lengths of the four box top edges. One classic approach capable of extracting lines from a collection of edge points is the Hough transform. Many other approaches may occur to one skilled in the art of image processing.

The tomosynthesis-like technique described above blurs edges perpendicular to the direction of the camera scanning motion. For best performance, the box is placed so that none of its edges are parallel to the scanning motion. In practice, the operator places the box so that its horizontal edges are roughly at an angle of 45 degrees with respect to the x and y axes. The orientation need not be precise, and may be made intuitive by properly orienting the camera scanning mechanism with respect to the table: since the natural inclination is to place a box with one side parallel to the front edge of the table, orienting the camera scan direction (the x axis) to make an angle of 45 degrees with this front edge may suffice.

As an alternative, instead of acquiring images along a linear translation path, images may be acquired along a non-linear or curved translation path (e.g., along a portion of a circular path). Such a non-linear path may help to blur certain edges more when desired, making the system more robust with respect to determining the height of the cuboid or box.

Charges for shipping a package depend on both weight and volume. The manner in which volume is factored into the cost is called "dimensional weight" or "dim weight". In many cases, the fees by the carriers to their customers are based on the so-called "dim-weight factor" or "dimensional weight factor" (DWF) of the package being shipped. DWF is a fictitious dimension based on length (L) times width (W) times height (H) of a package, divided by a standard agency or association-recognized conversion factor. If more accuracy of the box height measurement is required for dimensional weight applications, other means of determining the box height may be used. For example, an ultrasonic distance measurement device (like those used for the autofocus function of certain cameras) could be mounted directly above the box next to the camera scanning mechanism; by subtracting the measured distance to the box top from the known distance between the ultrasonic transmitter and the table top, the box height may be determined. As another example, a laser beam may be projected down onto the box top, with the beam slightly angled with respect to vertical, and the location of the beam in the camera images may be used to "triangulate" the box height. Either of these approaches may be used to determine the box height C [instead of using Eq. (7)], then Eqs. (8) would still give the other box dimensions, A and B.

Even if additional means are required to accurately measure box height, the tomosynthesis-like technique is still attractive since it blurs the background and permits robust finding of the box top edges. Furthermore, if the box height C is known then the tomosynthesis procedure may be simplified: the optimal pixel shift σ may be immediately calculated from Eq. (5), since $Z=Z_{max}-C$, and η, δ and $Z_{max}$ are known parameters. That is, by determining the height of the box with such direct techniques, the shift required for bringing the top of the box into focus may be determined apriori such that only one composite image is formed and used to determine the length and width of the box (i.e., the iterative technique of shifting the images may be abandoned).

The tomosynthesis-like method allows for simultaneously reducing the imaging depth of field and adjusting the location of the in-focus plane. This is also possible, to a limited extent, by adjusting the focus and aperture of a conventional lens. A conventional lens (with motorized aperture and focus controls) may possibly be used to accomplish the same measurements as the tomosynthesis-like method. However, calculations indicate (and experiments confirm) that, for practical box measurement geometries, the depth of field with a conventional lens is too large to allow accurate box height estimation or significant background blurring.

Again, as defined herein:
Z is the distance from the pinhole to the object,
η is the focal length in pixels,
δ is the distance the camera is translated in each step, and
σ is the distance each image is shifted or translated before averaging to form a composite image.

Figure 11:
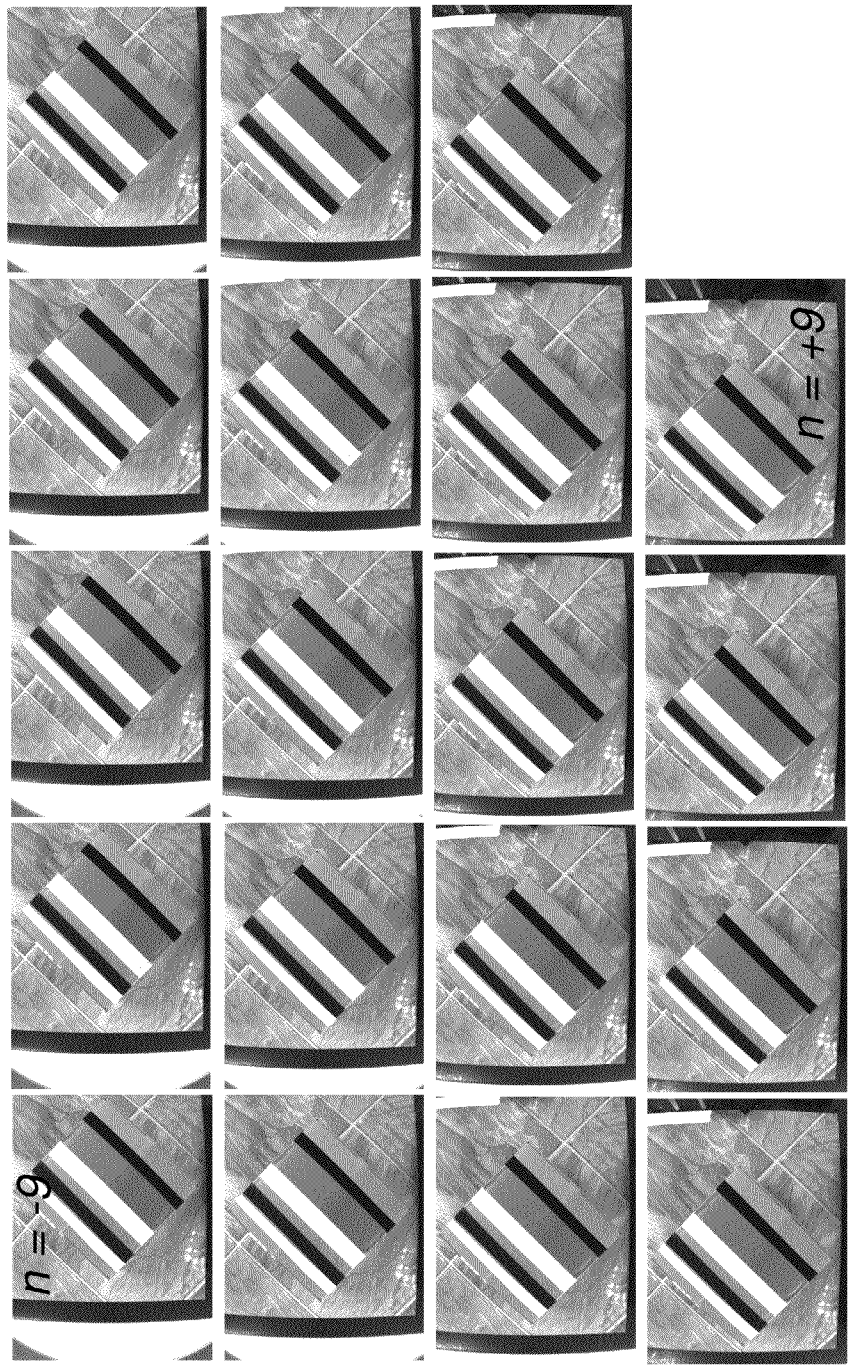
FIGS. 11-13 illustrate an exemplary embodiment of the process of acquiring a plurality of images of a box to be characterized at multiple camera positions and of forming composite images from those acquired images.
Figure 12:
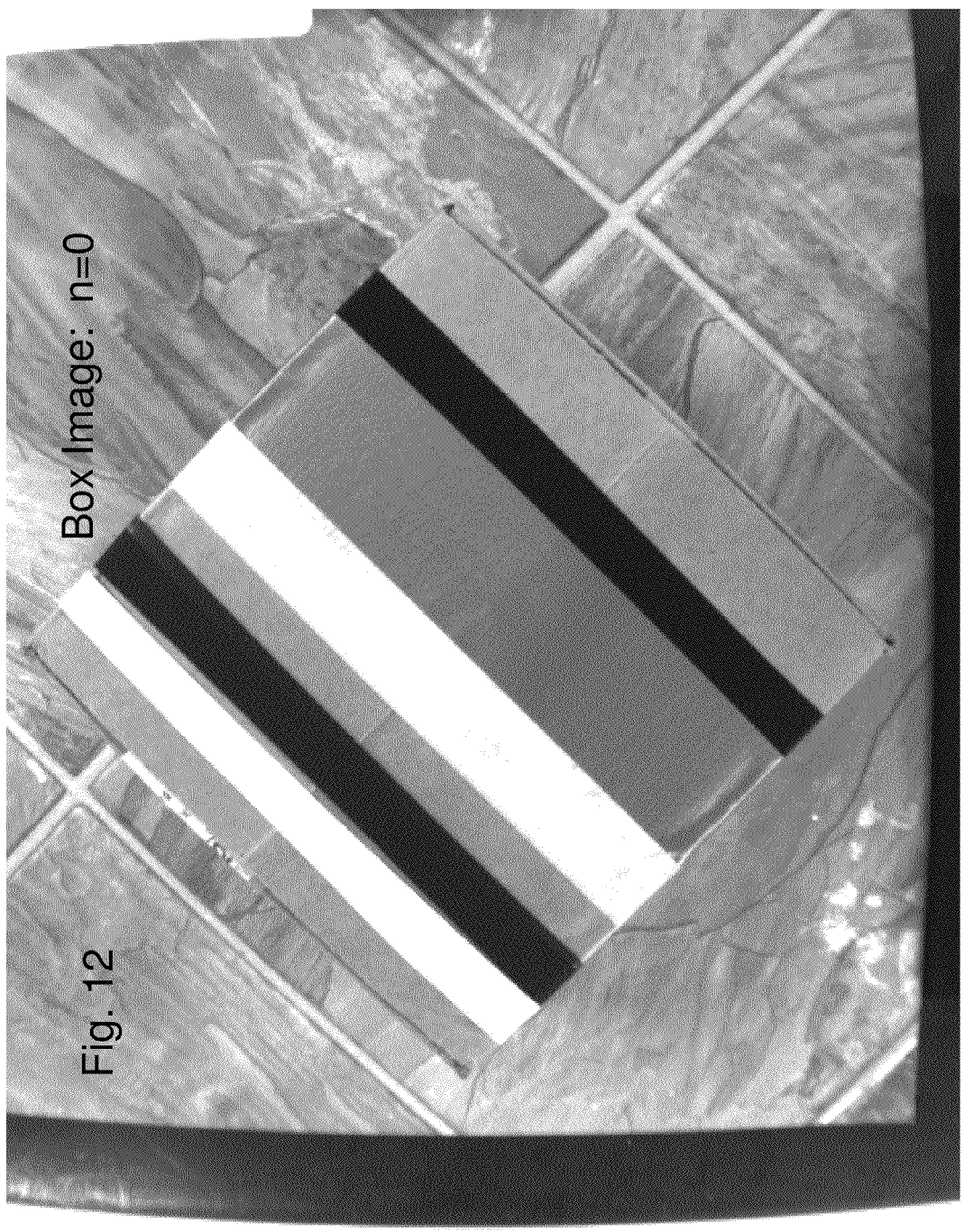
Figure 13:
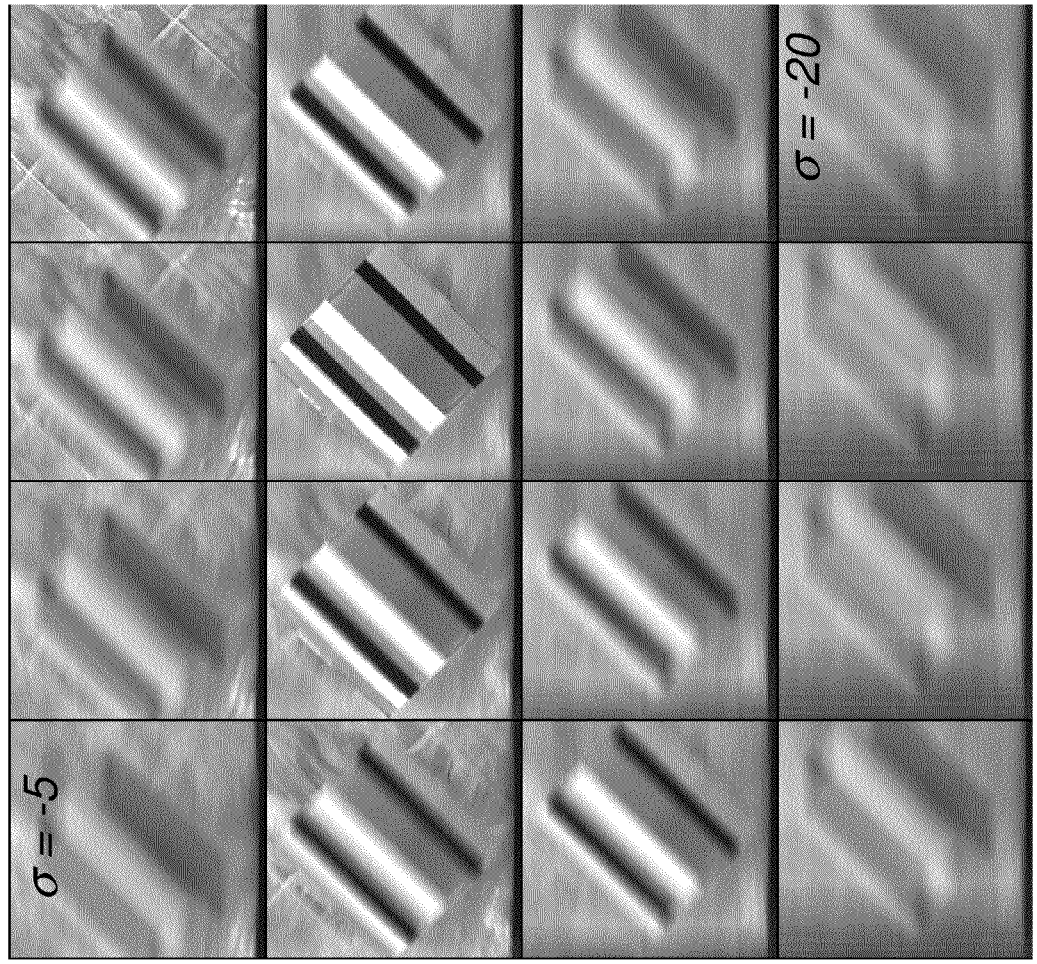
Figure 14:
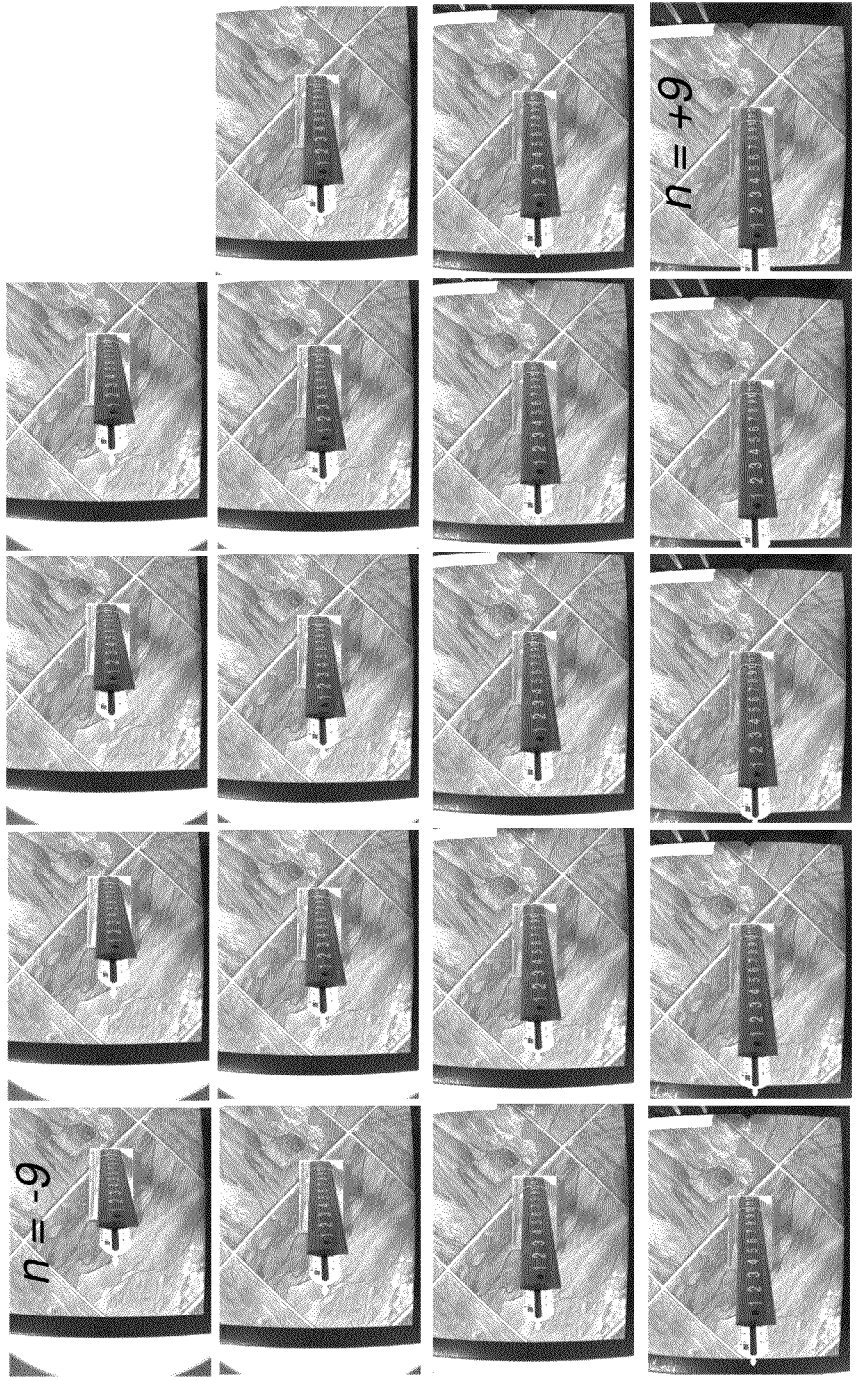
FIGS. 14-17 illustrate an exemplary embodiment of the process of acquiring a plurality of images of a slanted ruler to be characterized at multiple camera positions and of forming composite images from those acquired images.
Figure 15:
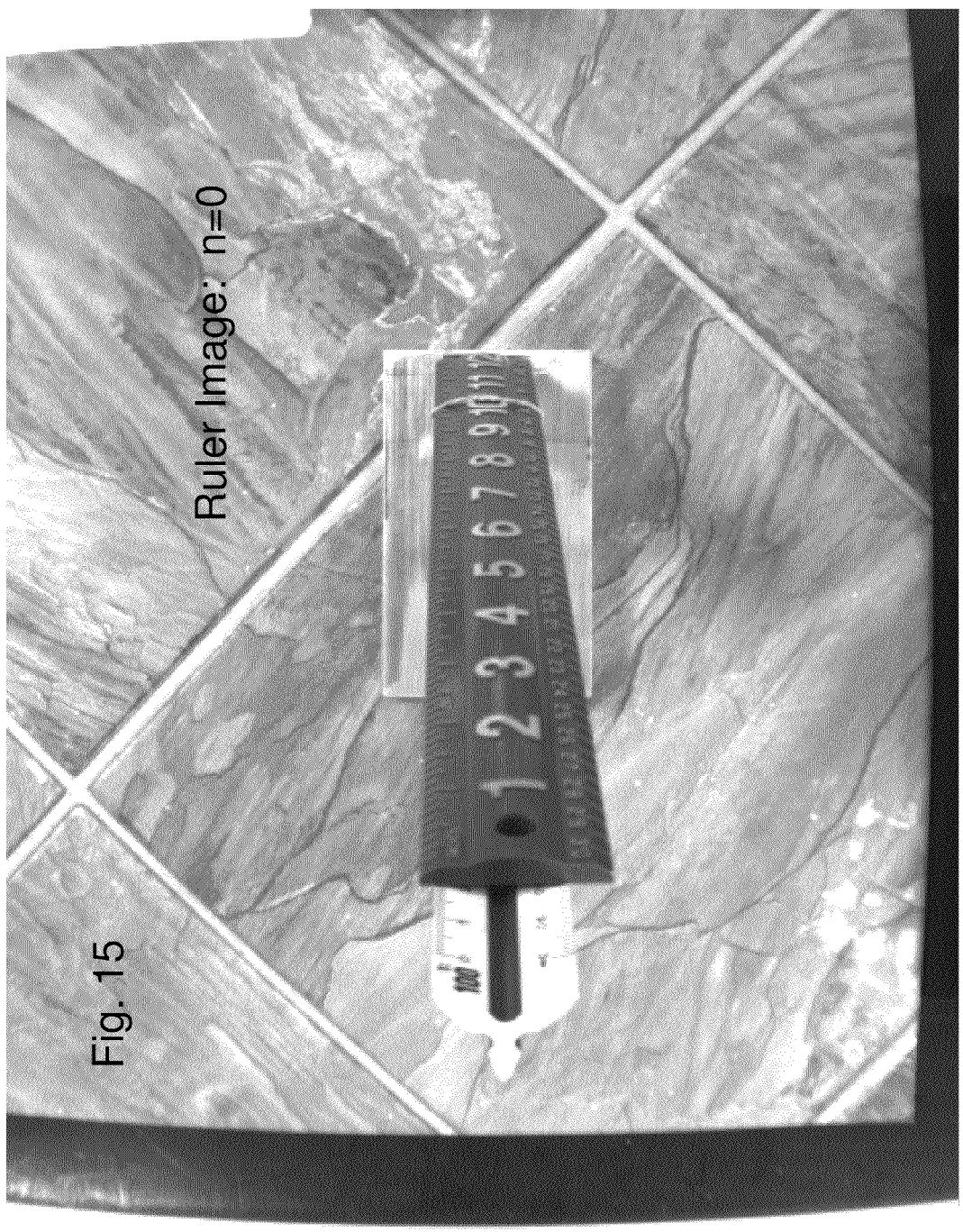
Figure 16:
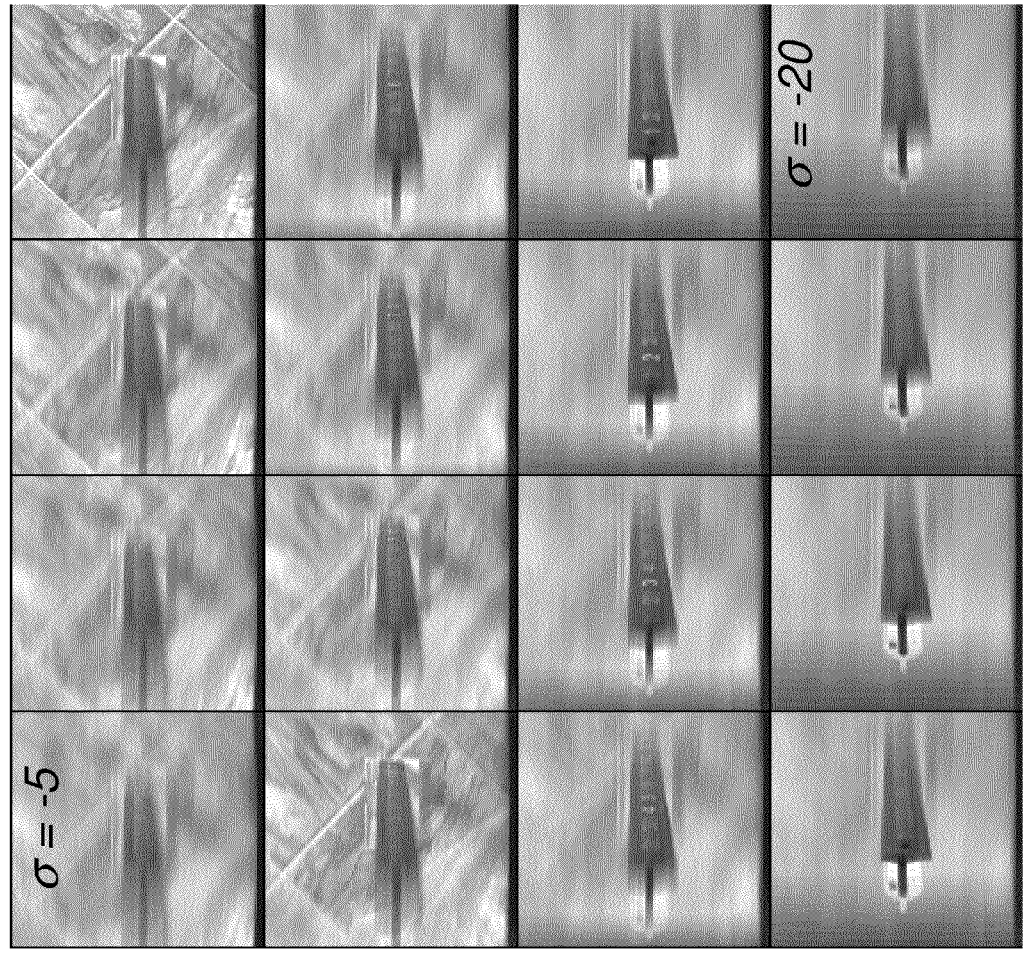
Figure 17:

Experiments verifying the viability of an embodiment of the present system and methods were performed by moving the camera manually along a dovetail slide, taking a total of 19 images (N=9) with an increment of δ≈0.25 inch between images, and with $Z_{max}$≈22 inches and η≈811. Two different objects were scanned in this manner: a box (A≈B≈7 inches square by C≈5 inches high . . . see FIGS. 11-13); and a 12-inch ruler standing nearly on-end, tipped about 30 degrees from vertical (see FIGS. 14-17). These raw images are presented in the drawings. Sequences of composite images corresponding to various values of σ are also presented. The ruler composite images (FIG. 16) clearly show how the in-focus plane moves up as σ becomes more negative. And the box composite images (FIG. 13) show how the top of the box comes into focus at a particular value of σ.

The scanning mechanism envisioned is straight-forward: a motorized linear slide moves the camera continuously and an encoder triggers image acquisitions at equally-spaced intervals. The camera exposure time is short enough to keep motion blur negligible. If ambient illumination is used for imaging and contains flicker, such as 120 Hz flicker due to a 60 Hz power line frequency, then the camera exposure time should be an integral number of flicker periods. A camera exposure time of 8.3 ms should fulfill both of these conditions for reasonable scanning times (of the order of a second). A strobe illuminator (LEDs or xenon) synchronized with image acquisition may also be incorporated into the system, to reduce the effects of ambient illumination and reduce motion blur.

In accordance with certain embodiments of the system described herein, the system is compact and located above the box to be estimated. It may be possible to install the system in most places where a scale is currently installed without disrupting the environment around the scale. Many prior art systems require sensors surrounding the box.

In accordance with embodiments of the system described herein, no physical contact is made with the box, so weighing of the box is not affected. Many prior art systems require the box to be positioned against physical guides.

The processing corresponding to the various methods and algorithms described herein may be performed by a vision engine (processor) and controller 160 which may or may not be built-in to an enclosed system including the single camera. Such a vision engine and controller 160 may take the form of a digital signal processor or a software-controlled processor, for example, in order to receive and process acquired images as described herein to estimate cuboid dimensions. Alternatively, the processing corresponding to the various methods and algorithms described herein may be performed by a personal computer (PC), for example, serial linked to the single camera. Such a PC may send commands to control a light source (ON/OFF sequence) and the camera translation, and may receive and process acquired images as described herein to estimate cuboid dimensions.

In summary, systems and methods to estimate the height profile of an object using tomosynthesis-like techniques are disclosed. A plurality of raw images of an object to be characterized are acquired, where the plurality of raw images are representative of a plurality of spatial shifts of an imaging device relative to the object to be characterized. The raw images are processed to generate composite images, where each composite image corresponds to a unique image shift between spatially adjacent raw images. A volatility parameter value is calculated within a neighborhood of a same image pixel location for each composite image. The composite image having the largest volatility parameter value for the image pixel location is determined. A unique image shift, corresponding to the composite image having the largest volatility parameter value, is transformed into a height value representative of a height dimension of the image pixel location.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiments disclosed, but that the claimed subject matter will include all embodiments falling within the scope of the appended claims.

What is claimed is:

1. A method to estimate the height profile of an object, said method comprising:
   acquiring a plurality of raw images of an object to be characterized using at least one imaging device, where said plurality of raw images are representative of a plurality of spatial shifts between said at least one imaging device and said object to be characterized occurring parallel to a surface that the object to be characterized is resting upon;
   processing said plurality of raw images to generate a plurality of composite images, where each composite image of said plurality of composite images corresponds to a unique image shift between spatially adjacent raw images and is made up of a plurality of image pixel locations;
   calculating a volatility parameter value within a neighborhood of at least one same image pixel location of said plurality of image pixel locations for each of said plurality of composite images;
   determining which composite image of said plurality of composite images has a largest volatility parameter value for said at least one same image pixel location;
   transforming said unique image shift, corresponding to said composite image having said largest volatility parameter value, into a height value representative of a height dimension of said at least one same image pixel location;
   generating a height value for each image pixel location of said plurality of image pixel locations to form a height profile image of said object to be characterized; and
   comparing said height profile image to at least one reference image to find any defects in said object to be characterized.

2. The method of claim 1 further comprising spatially translating said at least one imaging device relative to said object to be characterized during acquisition of said plurality of raw images.

3. The method of claim 1 further comprising spatially translating said object to be characterized relative to said at least one imaging device during acquisition of said plurality of raw images.

4. The method of claim 1 further comprising displaying said height profile image.

5. The method of claim 1 further comprising filtering said volatility parameter value across said plurality of composite images for said at least one same image pixel location before determining which composite image of said plurality of composite images has a largest volatility parameter value for said at least one same image pixel location.

6. The method of claim 1 wherein said unique image shift is a fraction of a distance between two adjacent image pixel locations.

7. The method of claim 1 wherein said processing said plurality of raw images includes using a sub-pixel location interpolation technique to generate said plurality of composite images.

8. A system to estimate the height profile of an object, said system comprising:
   means for acquiring a plurality of raw images of an object to be characterized, where said plurality of raw images are representative of a plurality of spatial shifts between said means for acquiring and said object to be characterized occurring parallel to a surface that the object to be characterized is resting upon;
   means for processing said plurality of raw images to generate a plurality of composite images, where each composite image of said plurality of composite images corresponds to a unique image shift between spatially adjacent raw images and is made up of a plurality of image pixel locations;
   means for calculating a volatility parameter value within a neighborhood of at least one same image pixel location of said plurality of image pixel locations for each of said plurality of composite images;
   means for determining which composite image of said plurality of composite images has a largest volatility parameter value for said at least one same image pixel location;
   means for transforming said unique image shift, corresponding to said composite image having said largest volatility parameter value, into a height value representative of a height dimension of said at least one same image pixel location;

means for generating a height value for each image pixel location of said plurality of image pixel locations to form a height profile image of said object to be characterized; and means for comparing said height profile image to at least one reference image to find any defects in said object to be characterized.

9. The system of claim 8 further comprising means for spatially translating said means for acquiring relative to said object to be characterized during acquisition of said plurality of raw images.

10. The system of claim 8 further comprising means for spatially translating said object to be characterized relative to said means for acquiring during acquisition of said plurality of raw images.

11. The system of claim 8 further comprising means for displaying said height profile image.

12. The system of claim 8 further comprising means for filtering said volatility parameter across said plurality of composite images for said at least one same image pixel location before determining which composite image of said plurality of composite images has a largest volatility parameter value for said at least one same image pixel location.

13. An apparatus to estimate the height profile of an object, said apparatus comprising:

at least one imaging device configured to acquire a plurality of raw images of an object to be characterized, where said plurality of raw images are representative of a plurality of spatial shifts between said at least one imaging device and said object to be characterized occurring parallel to a surface that the object to be characterized is resting upon; and a vision engine operatively connected to said at least one imaging device and configured to:

process said plurality of raw images to generate a plurality of composite images, where each composite image of said plurality of composite images corresponds to a unique image shift between spatially adjacent raw images and is made up of a plurality of image pixel locations;

calculate a volatility parameter value within a neighborhood of at least one same image pixel location of said plurality of image pixel locations for each of said plurality of composite images, determine which composite image of said plurality of composite images has a largest volatility parameter value for said at least one same image pixel location, transform said unique image shift, corresponding to said composite image having said largest volatility parameter value, into a height value representative of a height dimension of said at least one same image pixel location, generate a height value for each image pixel location of said plurality of image pixel locations to form a height profile image of said object to be characterized, and compare said height profile image to at least one reference image to find any defects in said object to be characterized.

14. The system of claim 13 further comprising a spatial translation mechanism operatively connected to said at least one imaging device and to said vision engine, and configured to spatially translate said at least one imaging device relative to said object to be characterized.

15. The system of claim 13 further comprising a spatial translation mechanism configured to spatially translate said object to be characterized relative to said at least one imaging device.

16. The system of claim 13 further comprising a display operatively connected to said vision engine and configured to display said height profile image.

17. The system of claim 13 wherein said vision engine is further configured to filter said volatility parameter value across said plurality of composite images for said at least one same image pixel location before determining which composite image of said plurality of composite images has a largest volatility parameter value for said at least one same image pixel location.

* * * * *

UNITED STATES PATENT AND TRADEMARK OFFICE
CERTIFICATE OF CORRECTION

PATENT NO.        : 8,508,591 B2
APPLICATION NO.   : 12/700764
DATED             : August 13, 2013
INVENTOR(S)       : Richard A. Sones et al.

It is certified that error appears in the above-identified patent and that said Letters Patent is hereby corrected as shown below:

In the Specification

Column 8; Line 31: delete "$(P^n, Q_n)$" and insert --$(P_n, Q_n)$--.

Signed and Sealed this
Twenty-sixth Day of November, 2013

Margaret A. Focarino
*Commissioner for Patents of the United States Patent and Trademark Office*